US012663523B2

(12) United States Patent
Mahara et al.

(10) Patent No.: US 12,663,523 B2
(45) Date of Patent: Jun. 23, 2026

(54) LIGHT RECEIVING DEVICE, DISTANCE MEASURING DEVICE, AND LIGHT RECEIVING CIRCUIT

(71) Applicant: SONY SEMICONDUCTOR SOLUTIONS CORPORATION, Kanagawa (JP)

(72) Inventors: Kumiko Mahara, Kanagawa (JP); Osamu Ozawa, Kanagawa (JP); Tomohiro Matsukawa, Kanagawa (JP); Yasuhiro Shinozuka, Kanagawa (JP); Keitarou Amagawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 1017 days.

(21) Appl. No.: 17/790,081

(22) PCT Filed: Dec. 23, 2020

(86) PCT No.: PCT/JP2020/048115
§ 371 (c)(1),
(2) Date: Jun. 29, 2022

(87) PCT Pub. No.: WO2021/140912
PCT Pub. Date: Jul. 15, 2021

(65) Prior Publication Data
US 2023/0048083 A1 Feb. 16, 2023

(30) Foreign Application Priority Data
Jan. 10, 2020 (JP) ................................ 2020-003075

(51) Int. Cl.
*G01S 7/48* (2006.01)
*G01S 7/4863* (2020.01)
(Continued)

(52) U.S. Cl.
CPC ............ *G01S 7/497* (2013.01); *G01S 7/4863* (2013.01); *G01S 7/4865* (2013.01); *G01S 17/10* (2013.01)

(58) Field of Classification Search
USPC ........................................................ 356/4.01
See application file for complete search history.

(56) References Cited

U.S. PATENT DOCUMENTS 7,898,647 B2 * 3/2011 Sakai ...................... G01S 17/14
356/5.01
11,901,700 B2 * 2/2024 Masumitsu ......... H01S 5/06825
(Continued)

FOREIGN PATENT DOCUMENTS

CN 1855258 A 11/2006
CN 202818097 U 3/2013
(Continued)

OTHER PUBLICATIONS

English Translation of the Written Opinion of the International Search Authority for PCT/JP2020/048115 (5 pages) (Year: 2021).*
(Continued)

*Primary Examiner* — James R Hulka
(74) *Attorney, Agent, or Firm* — CHIP LAW GROUP

(57) ABSTRACT

Provided are a light receiving device, a light receiving circuit, and a distance measuring device capable of minimizing dead time.
A light receiving device according to the present disclosure may include: a light receiving circuit including a light receiving element; a power supply circuit configured to supply a power supply potential to the light receiving circuit; and a control circuit configured to control the power supply potential supplied by the power supply circuit on the basis of a signal output from the light receiving circuit in a reaction with a photon.

15 Claims, 24 Drawing Sheets

(51) Int. Cl.

| | |
|---|---|
| *G01S 7/4865* | (2020.01) |
| *G01S 7/497* | (2006.01) |
| *G01S 17/10* | (2020.01) |

(56) References Cited

U.S. PATENT DOCUMENTS

| | | | |
|---|---|---|---|
| 2008/0030398 A1 | 2/2008 | Nakamura | |
| 2008/0048795 A1* | 2/2008 | Hoshino | H03L 5/00 |
| | | | 331/109 |
| 2009/0115992 A1* | 5/2009 | Sakai | G01S 17/14 |
| | | | 356/5.01 |
| 2011/0032959 A1* | 2/2011 | Ueno | G01S 7/4916 |
| | | | 702/106 |
| 2018/0172805 A1 | 6/2018 | Bestler | |
| 2020/0176951 A1* | 6/2020 | Masumitsu | G01S 7/4865 |

FOREIGN PATENT DOCUMENTS

| | | | |
|---|---|---|---|
| CN | 205566723 | U | 9/2016 |
| CN | 106382993 | A | 2/2017 |
| CN | 110596722 | A | 12/2019 |
| CN | 112313532 | A | 2/2021 |
| EP | 3147690 | A1 | 3/2017 |
| JP | 2008-053784 | A | 3/2008 |
| JP | 2008-218911 | A | 9/2008 |
| JP | 2008-542706 | A | 11/2008 |
| JP | 2014-081254 | A | 5/2014 |
| JP | 2015-117970 | A | 6/2015 |
| JP | 2018-179732 | A | 11/2018 |
| JP | 2019-041201 | A | 3/2019 |
| JP | 2019-184297 | A | 10/2019 |
| JP | 2020-143959 | A | 9/2020 |
| WO | 2007/004606 | A1 | 1/2007 |

OTHER PUBLICATIONS

International Search Report and Written Opinion of PCT Application No. PCT/JP2020/048115, issued on Mar. 9, 2021, 15 pages of ISRWO.

\* cited by examiner

| CURRENT | NUMBER OF ERROR DETERMINATIONS |
|---|---|
| 18μA | 10 |
| 15μA | 7 |
| 12μA | 3 |
| 9μA | 1 |

← T1

| Delay | NUMBER OF ERROR DETERMINATIONS |
|---|---|
| 2ns | 20 |
| 4ns | 5 |
| 6ns | 3 |
| 8ns | 1 |

| Vdd | NUMBER OF ERROR DETERMINATIONS |
|------|------|
| 3.0V | 15 |
| 3.5V | 7 |
| 4.0V | 3 |
| 4.5V | 1 |

Figure 24:
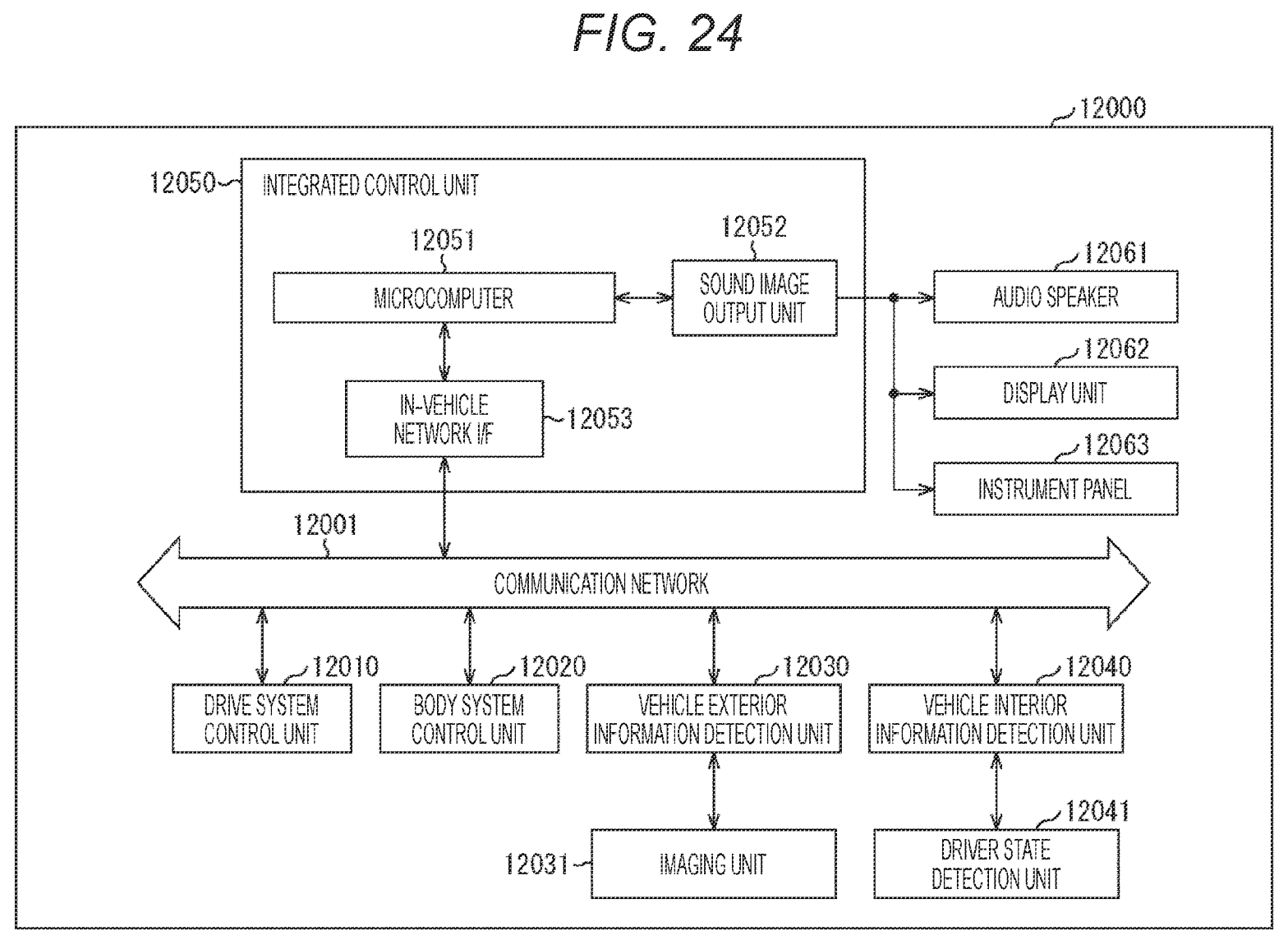

INTEGRATED CONTROL UNIT 12050

MICROCOMPUTER 12051

SOUND IMAGE OUTPUT UNIT 12052

IN-VEHICLE NETWORK I/F 12053

AUDIO SPEAKER 12061

DISPLAY UNIT 12062

INSTRUMENT PANEL 12063

COMMUNICATION NETWORK 12001

DRIVE SYSTEM CONTROL UNIT 12010

BODY SYSTEM CONTROL UNIT 12020

VEHICLE EXTERIOR INFORMATION DETECTION UNIT 12030

IMAGING UNIT 12031

VEHICLE INTERIOR INFORMATION DETECTION UNIT 12040

DRIVER STATE DETECTION UNIT 12041

LIGHT RECEIVING DEVICE, DISTANCE MEASURING DEVICE, AND LIGHT RECEIVING CIRCUIT

CROSS REFERENCE TO RELATED APPLICATIONS

This application is a U.S. National Phase of International Patent Application No. PCT/JP2020/048115 filed on Dec. 23, 2020, which claims priority benefit of Japanese Patent Application No. JP 2020-003075 filed in the Japan Patent Office on Jan. 10, 2020. Each of the above-referenced applications is hereby incorporated herein by reference in its entirety.

TECHNICAL FIELD

The present disclosure relates to a light receiving device, a distance measuring device, and a light receiving circuit.

BACKGROUND ART

In a plurality of fields such as in-vehicle and mobile, application of a technology for measuring a distance to an object on the basis of a time of flight (ToF) until irradiation light from a light emitting element is reflected by the object and returns to a light receiving element has been advanced. An avalanche photodiode (APD) is known as a light receiving element. In the Geiger mode APD, a voltage equal to or higher than a breakdown voltage is applied across terminals, and an avalanche phenomenon occurs due to incidence of a single photon. An APD that multiplies a single photon by an avalanche phenomenon is called a single photon avalanche diode (SPAD).

In the SPAD, the avalanche phenomenon can be stopped by lowering the voltage across the terminals to the breakdown voltage. Reducing the voltage across the terminals and stopping the avalanche phenomenon is called quenching. Then, when the voltage across the terminals of the SPAD is recharged to a bias voltage equal to or higher than the breakdown voltage, the photon can be detected again.

CITATION LIST

Patent Document

Patent Document 1: Japanese Patent Application Laid-Open No. 2010-091377
Patent Document 2: Japanese Patent Application Laid-Open No. 2014-081254
Patent Document 3: Japanese Patent Application Laid-Open No. 2018-179732
Patent Document 4: Japanese Patent Application National Publication (Laid-Open) No. 2008-542706

SUMMARY OF THE INVENTION

Problems to be Solved by the Invention

Before starting measurement of the distance by ToF, it is desirable to perform setting to shorten dead time during which photons cannot be detected.

Therefore, the present disclosure provides a light receiving device, a light receiving circuit, and a distance measuring device capable of minimizing dead time.

Solutions to Problems

A light receiving device according to one aspect of the present disclosure includes: a light receiving circuit including a light receiving element; a power supply circuit configured to supply a power supply potential to the light receiving circuit; and a control circuit configured to control the power supply potential supplied by the power supply circuit on the basis of a signal output from the light receiving circuit in a reaction with a photon.

The light receiving device may further include a load circuit that is connected to the light receiving circuit and supplies a recharge current to the light receiving element, and the control circuit may be configured to change a parameter including at least one of the recharge current of the load circuit or a resistance value of the load circuit on the basis of the signal.

The light receiving device may include a plurality of the light receiving circuit, and the control circuit may be configured to change at least one of the power supply potential of the power supply circuit or the parameter of the load circuit connected to at least one of the light receiving circuit on the basis of the signal output from the plurality of the light receiving circuit.

The light receiving device may further include an error detector configured to perform error determination on the basis of a waveform of the signal output from the light receiving circuit, and the control circuit may be configured to change at least one of the power supply potential of the power supply circuit or the parameter of the load circuit connected to at least one of the light receiving circuit based on the number of error determinations for the signal output from the plurality of the light receiving circuit.

At least one of the light receiving circuit may be configured to perform passive recharge, and the control circuit may be configured to adjust the recharge current of the light receiving circuit so that the number of error determinations is less than a first threshold.

At least one of the light receiving circuit may be configured to perform active recharge, and the control circuit may be configured to adjust a time delay in which a pulse is generated for the active recharge in the light receiving circuit on the basis of the number of error determinations.

The error detector may be configured to perform error determination for at least one of the signal whose pulse width exceeds a second threshold or the signal whose interval between pulses is less than a third threshold.

The light receiving device may further include an error correction circuit configured to perform error determination on the basis of a waveform of the signal output from the light receiving circuit and correct the waveform of the signal for which the error determination has been performed.

The error correction circuit may be configured to perform error determination for at least one of the signal whose pulse width exceeds a second threshold or the signal whose interval between pulses is less than a third threshold.

The control circuit may be configured to change at least one of the power supply potential of the power supply circuit or the parameter of the load circuit connected to at least one of the light receiving circuit on the basis of the number of error determinations for the signal output from the plurality of the light receiving circuit.

At least one of the light receiving circuit may be configured to perform passive recharge, and the control circuit may be configured to adjust the recharge current of the light receiving circuit so that the number of error determinations is less than a first threshold.

At least one of the light receiving circuit may be configured to perform active recharge, and the control circuit may be configured to adjust a time delay in which a pulse is generated for the active recharge in the light receiving circuit on the basis of the number of error determinations.

The light receiving element may be an avalanche photo-diode.

A distance measuring device according to one aspect of the present disclosure may include: a light emitting element; a plurality of light receiving circuits including the light receiving element; a power supply circuit configured to supply a power supply potential to the plurality of light receiving circuits; and a control circuit configured to control the power supply potential on the basis of a signal output from the plurality of light receiving circuits in a reaction with a photon during a period in which the light emitting element does not emit light.

The light receiving device may further include a plurality of load circuits that is connected to each of the light receiving circuits and supplies a recharge current to the light receiving element, and the control circuit may be configured to control at least one of a resistance value or the recharge current of the plurality of load circuits on the basis of the signal.

The control circuit may be configured to adjust a time delay in which a pulse for active recharge is generated in at least one of the light receiving circuits on the basis of the signal.

A light receiving circuit according to one aspect of the present disclosure may include: a light receiving element; a current source; a switch capable of turning on either a first contact side connected to a reference potential or a second contact side connected to the light receiving element; a current mirror circuit configured to supply, from an output side, a second current obtained by mirroring a first current flowing between the reference potential and the current source; and a transistor having a first signal electrode connected to the reference potential, a second signal electrode connected to the light receiving element and the output side of the current mirror circuit, and a control electrode connected to the switch.

The light receiving circuit may include a plurality of the switch and the transistor, and may be configured such that a third current obtained by multiplying the first current by N (N is a positive integer) is supplied to the light receiving element in response to switching of the switch.

The light receiving circuit may further include a readout circuit configured to generate a pulse when the light receiving element reacts with a photon.

A light receiving circuit according to one aspect of the present disclosure may include: a light receiving element; a plurality of resistors connected in parallel between a reference potential and the light receiving element; a plurality of switches each connected in series with the resistor; and a readout circuit configured to generate a pulse when the light receiving element reacts with a photon, and may be configured such that a current supplied to the light receiving element is adjusted according to switching of the switches.

BRIEF DESCRIPTION OF DRAWINGS

FIG. 1 is a block diagram illustrating an example of a light receiving device.

FIG. 11 is a table illustrating an example of settings and the number of error determinations in the light receiving device or the distance measuring device.

FIG. 13 is a circuit diagram illustrating an example of a load circuit whose current value can be adjusted.

FIG. 20 is a block diagram illustrating an example of a distance measuring device according to Modification 3.

FIG. 24 is a block diagram showing an example of a schematic configuration of a vehicle control system.

MODE FOR CARRYING OUT THE INVENTION

Figure 2:
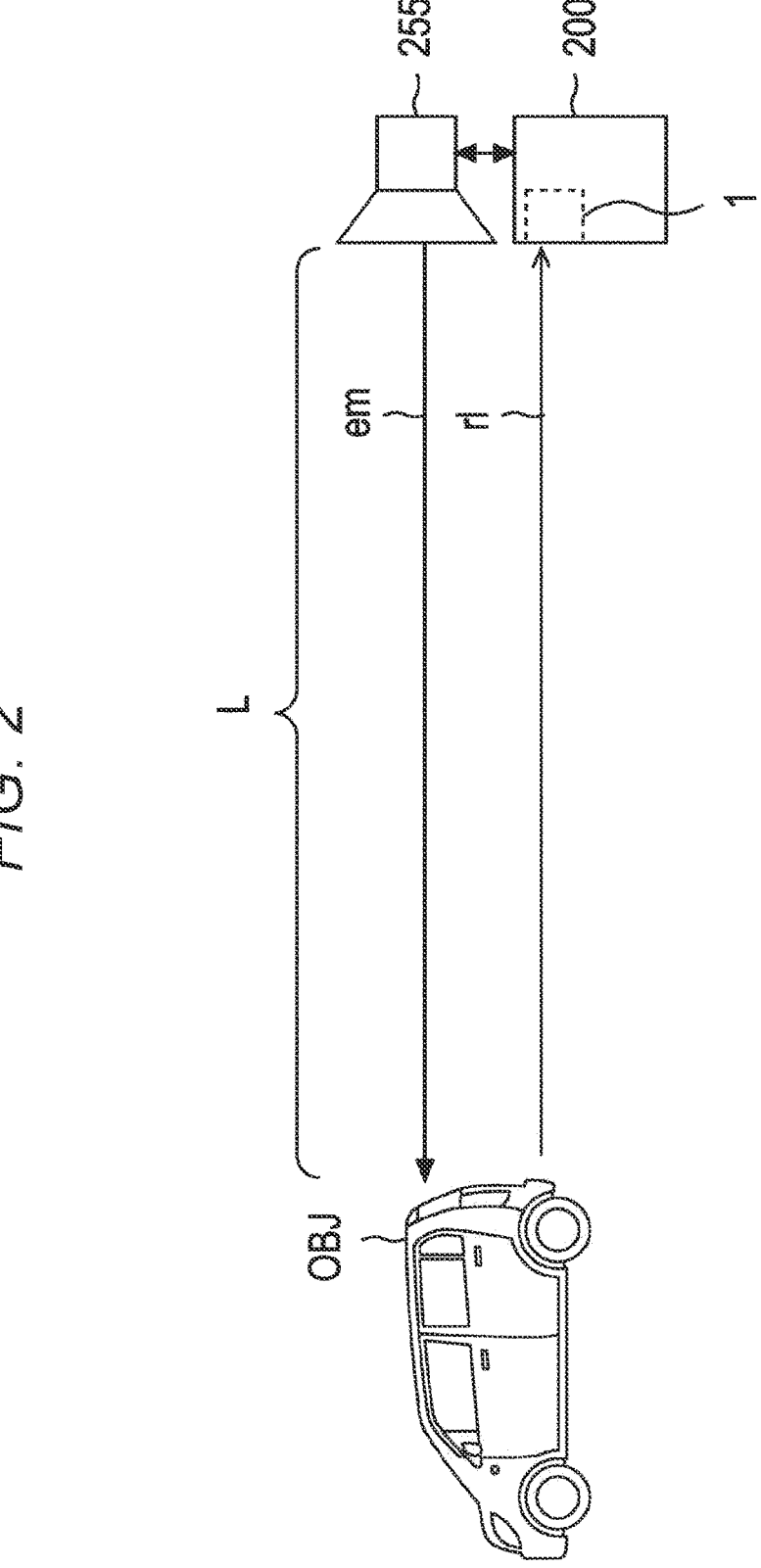
FIG. 2 is a diagram schematically illustrating an example of distance measurement using the light receiving device.

Preferred embodiments of the present disclosure will be described in detail below with reference to the accompanying drawings. Note that, in the present specification and the drawings, the same reference numerals are given to the constituent elements having substantially the same functional configuration, and redundant explanations are omitted.

Figure 1:
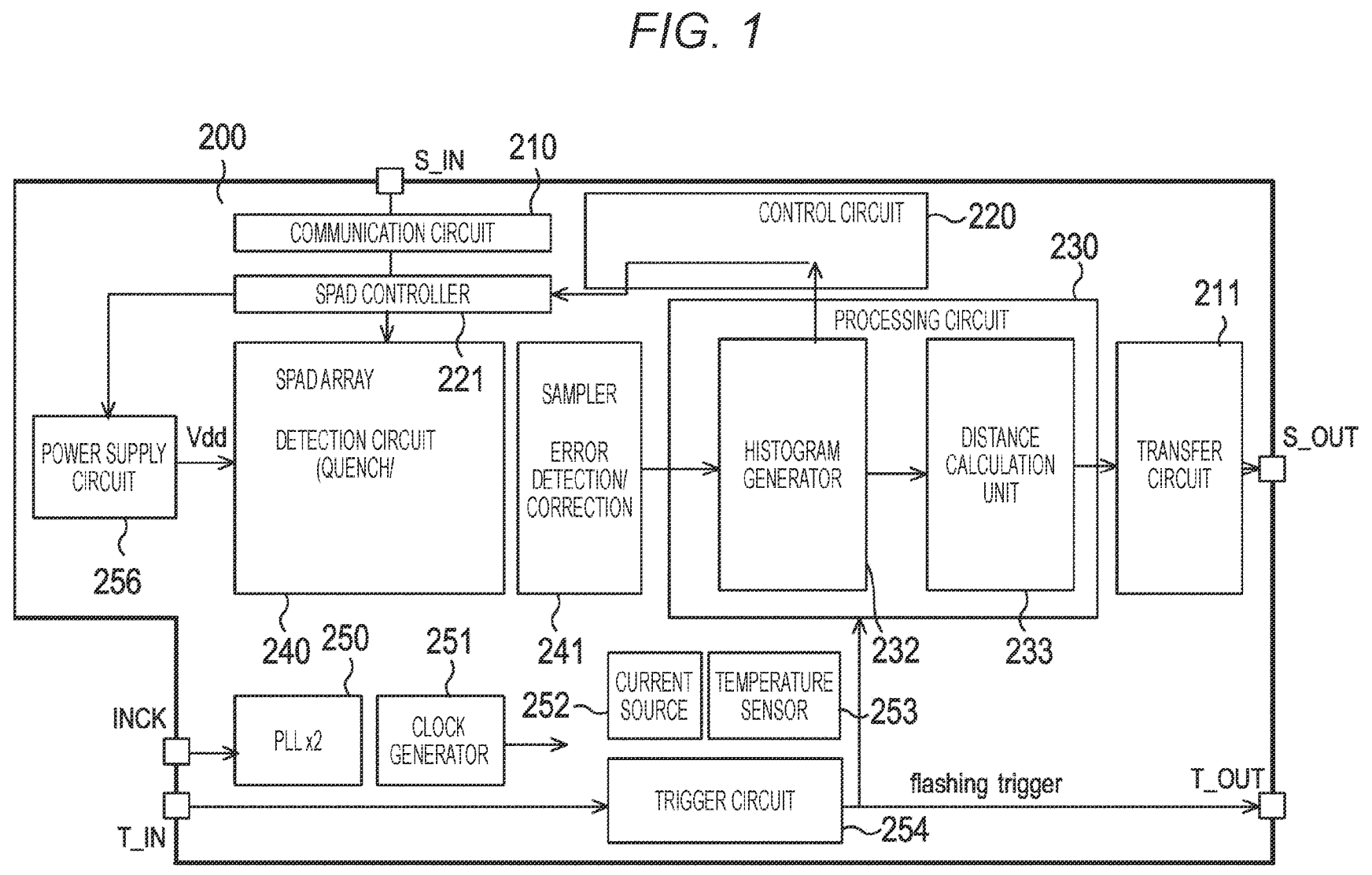

The block diagram of FIG. 1 illustrates an example of a light receiving device. Furthermore, FIG. 2 schematically illustrates an example of distance measurement using the light receiving device. A light receiving device 200 of FIG. 1 includes a communication circuit 210, a control circuit 220, a SPAD controller 221, a SPAD array 240, a circuit block 241, a processing circuit 230, a transfer circuit 211, a PLL 250, a clock generator 251, a current source 252, a temperature sensor 253, a trigger circuit 254, and a power supply circuit 256. The processing circuit 230 includes a histogram generator 232 and a distance calculation unit 233 as internal components. Furthermore, the light receiving device 200 is connected to a light emitting element 255 in FIG. 2 via a terminal T_OUT.

The communication circuit 210 and the transfer circuit 211 communicate with an external circuit. The control circuit 220 controls each component of the light receiving device 200. The SPAD array 240 corresponds to a detection unit 1 in FIG. 2. In the SPAD array 240, for example, a plurality of SPADs and a light receiving circuit corresponding to each SPAD are mounted. The SPAD array includes a plurality of single photon avalanche diodes (SPADs). The light receiving circuit is configured to output a pulse to a subsequent circuit when the SPAD reacts with a photon. Furthermore, the light receiving circuit includes a circuit that quenches the SPAD and performs recharge. The SPAD controller 221 controls the light receiving circuit. The SPAD controller 221 performs, for example, switching of a switch in the light receiving circuit, control of a current value, and control of a pulse generation timing.

The circuit block 241 includes, for example, a sampler connected to a subsequent stage of each light receiving circuit. The sampler is also called a buffer, and digitizes a signal input from the light receiving circuit. Furthermore, the circuit block 241 may include an error detector and an error correction circuit. Details of the error detector and the error correction circuit will be described later. The trigger circuit 254 controls light emission timing of the light emitting element 255.

The histogram generator 232 samples the voltage level of the digitized output signal of each light receiving circuit and generates a histogram. The histogram generator 232 may repeat the sampling operation a plurality of times to generate a histogram. By performing the sampling operation a plurality of times, it is possible to distinguish reflected light r1 of light emitted from the light emitting element from other light. The histogram generator 232 may perform operation such as averaging of measurement results over a plurality of times when generating the histogram. The distance calculation unit 233 calculates the distance between the light receiving device 200 and the object on the basis of information regarding irradiation time t0 of the light transferred from the trigger circuit 254 and peak time t1 of the histogram. For example, when a light velocity is c, a distance between the light receiving device 200 and an object OBJ can be obtained by an equation of $L=c/2 \ (t1-t0)$. In the equation, $t1-t0$ corresponds to a flight time. The transfer circuit 211 may be used to transfer information including the calculated distance to an external circuit. A device having a function of calculating a distance to an object, such as the light receiving device 200, is referred to as a distance measuring device.

The power supply circuit 256 is a circuit that supplies a power supply potential Vdd to a light receiving circuit mounted as a pixel in the SPAD array 240. As the light receiving circuit in the SPAD array 240, each of the circuits described in the above circuit diagrams can be used. That is, the power supply circuit 256 is electrically connected to a signal line of the power supply potential Vdd in a circuit diagram as described later. Furthermore, the power supply circuit 256 is connected to the SPAD controller 221 via a control signal line. The SPAD controller 221 can change the value of the power supply potential Vdd by transmitting a control signal to the power supply circuit 256.

The power supply circuit 256 may be controlled by a component other than the SPAD controller 221. For example, the control circuit 220 that determines the recharge method in the light receiving circuit may directly control the power supply circuit 256.

For example, the components of the processing circuit 230 including the histogram generator 232 and the distance calculation unit 233 can be implemented by a hardware circuit such as a field programmable gate array (FPGA) or an application specific integrated circuit (ASIC). However, the function of the processing circuit 230 may be implemented by a central processing unit (CPU) and a program executed on the CPU. In this case, the processing circuit 230 may include a memory or a storage that stores a program and data necessary for executing the program.

Note that the light receiving device 200 in FIG. 1 is merely an example of the configuration of the light receiving device. Accordingly, the configuration of the light receiving device according to the present disclosure may be different from that of the light receiving device 200. The light receiving device may not include all the components of the light receiving device 200. For example, in the light receiving device, at least one of the PLL 250, the clock generator 251, the current source 252, the temperature sensor 253, the trigger circuit 254, and the communication circuit 210 may be omitted. Furthermore, other components may be added, or other components may be omitted.

Figure 3:
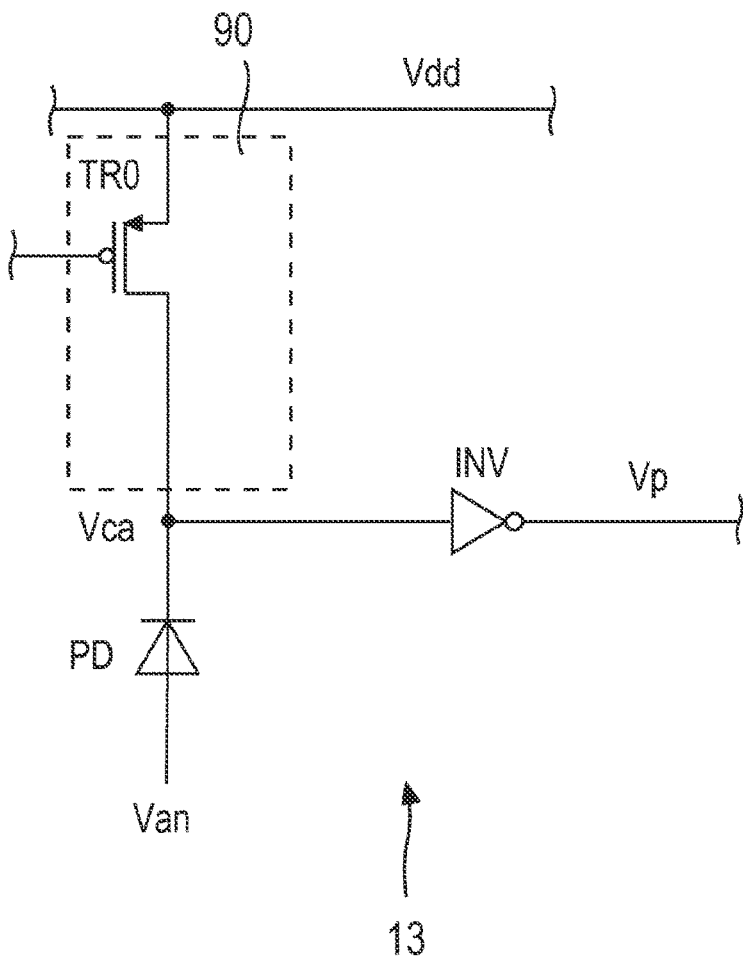
FIG. 3 is a circuit diagram illustrating an example of a light receiving circuit that performs passive recharge.
Figure 4:
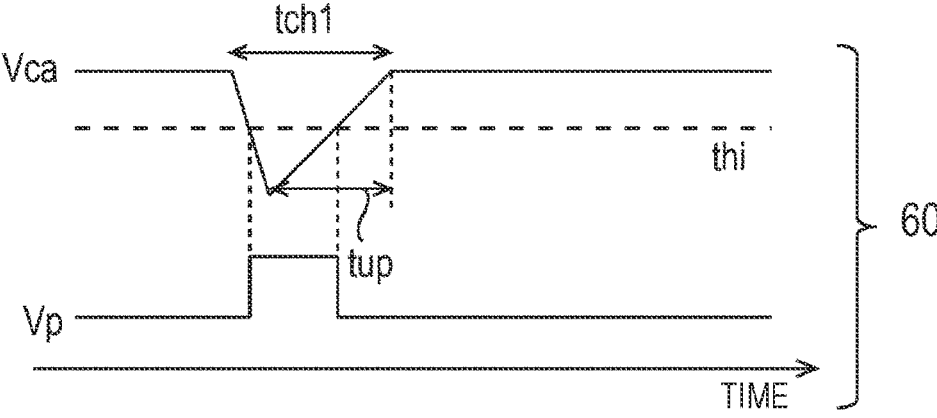
FIG. 4 is a graph illustrating an example of a voltage waveform in the light receiving circuit of FIG. 4.
Figure 4:
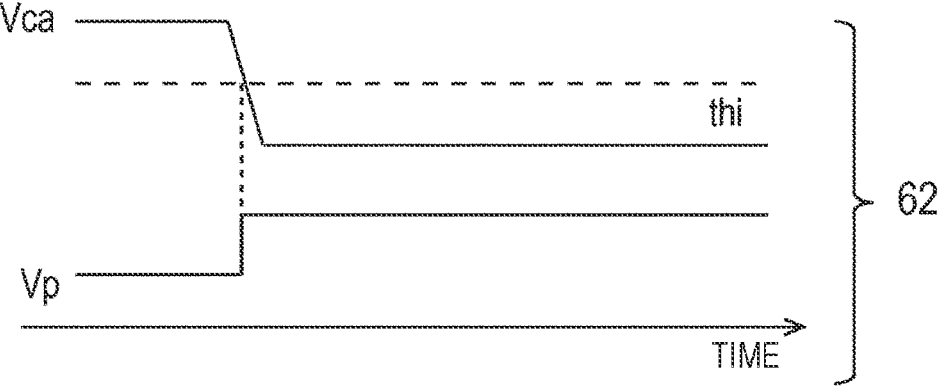

The circuit diagram of FIG. 3 illustrates an example of a light receiving circuit used for photon detection. Furthermore, the graph of FIG. 4 illustrates an example of a voltage waveform in the light receiving circuit. The light receiving circuit 13 in FIG. 3 includes a photodiode PD, a transistor TR0, and an inverter INV. The transistor TR0 is a PMOS transistor. For example, a SPAD can be used as the photodiode PD. The source of the transistor TR0 is connected to the power supply potential Vdd. The drain of the transistor TR0 is connected to the cathode of the photodiode PD. A voltage Van is applied to the anode of the photodiode PD. A reverse voltage equal to or higher than the breakdown voltage is applied across the terminals of the photodiode PD by the voltage Van. The input side of the inverter INV is connected to the drain of the transistor TR0 and the cathode of the photodiode PD. Furthermore, a subsequent circuit such as a buffer is connected to the output side of the inverter INV.

The transistor TR0 is an example of a load element 90 of the light receiving circuit 13. However, the configuration of the load element may be different from this. For example, a resistor may be used as the load element, or a combination of a transistor and a resistor may be used. Furthermore, a load circuit including a plurality of elements may be connected to the position of the load element.

When a photon enters the photodiode PD and a current flowing across terminals of the photodiode PD increases due to avalanche multiplication, a cathode potential Vca decreases according to a voltage drop in the load element 90. When the voltage across the terminals of the photodiode PD decreases to the breakdown voltage, the avalanche phenomenon stops, and the current flowing across the terminals of the photodiode PD decreases. As a result, the voltage across the terminals of the photodiode PD becomes a value equal to or higher than the breakdown voltage, and photons can be detected again (Vca of the graph 60). On the other hand, the inverter INV outputs a pulse of HIGH (positive polarity) in a period in which the cathode potential Vca is equal to or less than a threshold thi (Vp of the graph 60). Since the light receiving circuit 13 outputs a pulse at the time of photon detection, various processes such as photon counting, histogram generation, and flight time calculation can be performed in a subsequent circuit.

Note that the circuit that performs the operation illustrated in the graph 60 is referred to as a passive recharge circuit. The above-described light receiving circuit 13 is an example of a passive recharge circuit. As the passive recharge circuit, a circuit having a configuration different from that of the light receiving circuit 13 may be used. For example, a circuit whose polarity is inverted may be used. Furthermore, a circuit in which another element is added to the light receiving circuit 13 may be used. When the passive recharge circuit is used, power consumption can be suppressed.

During a period from when the photodiode PD reacts with the photon until the avalanche phenomenon is stopped (quenched) and the voltage across the terminals of the photodiode PD is recharged to be equal to or higher than the breakdown voltage again, the photodiode PD cannot detect photons. This period is referred to as dead time. When the current supplied from the load element 90 is insufficient, a time tup until the voltage Vca illustrated in the graph 60 rises becomes long, and the dead time becomes long. A current supplied from the load element or the load circuit in order to reset the voltage level of the terminal of the light receiving element (for example, the photodiode PD) is referred to as a recharge current. In a case where a passive recharge circuit is used as the light receiving circuit, it is preferable to set the recharge current of the light receiving circuit so as to minimize the dead time before starting processing such as distance measurement. For example, in the calibration processing performed at the time of factory shipment, initial startup, or initialization operation of the distance measuring device, it is possible to determine the recharge current in the light receiving circuit (pixel) in the SPAD array 240, minimize the dead time, and improve the distance measuring performance.

Note that, in the passive recharge circuit, if the recharge current is too large, the voltage across the terminals of the photodiode PD does not decrease to the breakdown voltage, so that quenching cannot be performed (Vca in the graph 61). At this time, since the output voltage of the inverter INV sticks, it is difficult to detect photons. Therefore, in order to enhance the distance measurement performance, it is desirable to suppress the probability of occurrence of a deadlock of the output voltage without supplying an excessive recharge current to the light receiving element.

Figure 5:
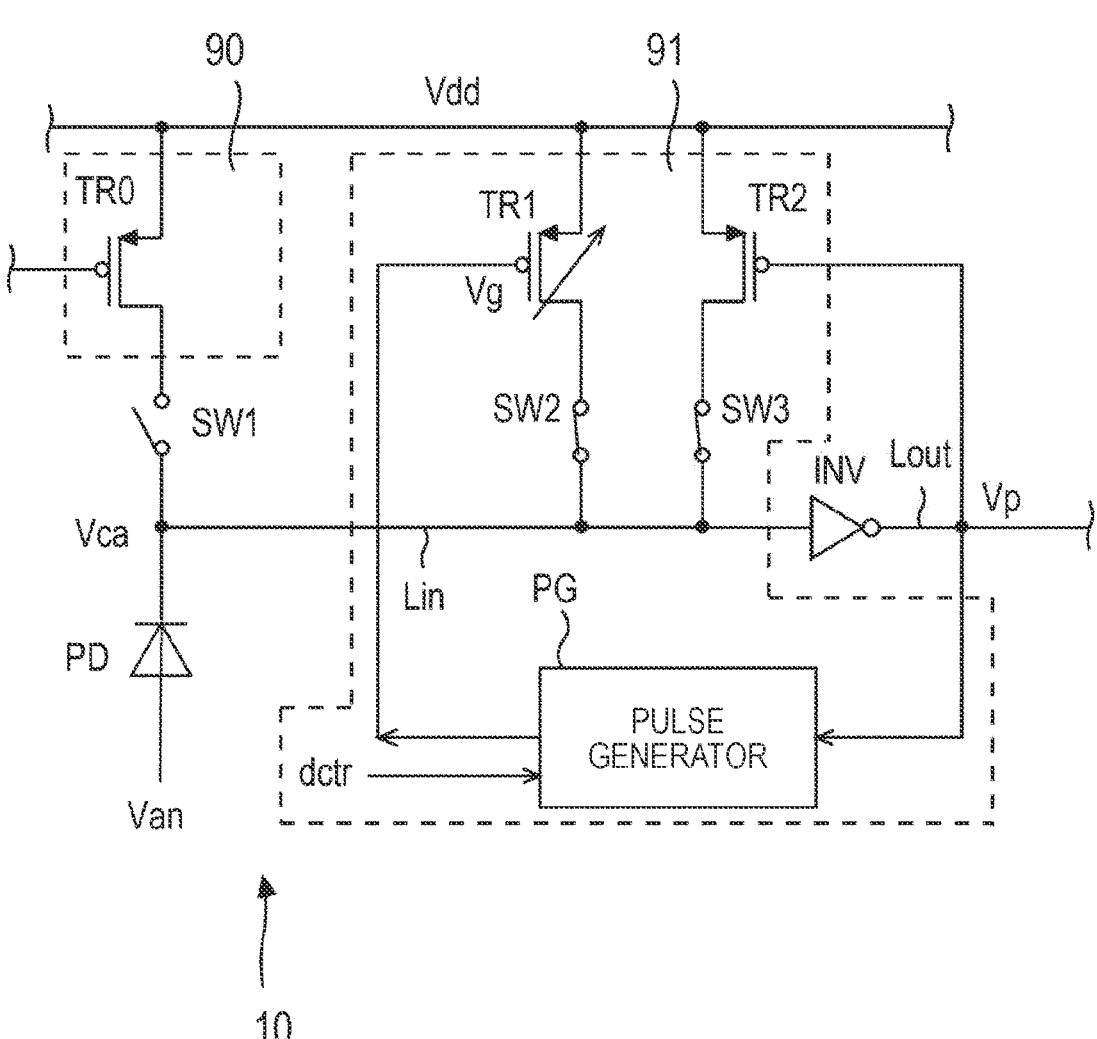
FIG. 5 is a circuit diagram illustrating an example of a light receiving circuit that performs active recharge.

The circuit diagram of FIG. 5 illustrates an example of a circuit according to the present disclosure. A light receiving circuit 10 in FIG. 5 includes a photodiode PD, a switch SW1, a transistor TR0, a transistor TR1, a switch SW2, a transistor TR2, a switch SW3, an inverter INV, and a pulse generator PG. The transistor TR0, the transistor TR1, and the transistor TR2 are all PMOS transistors. For example, a SPAD can be used as the photodiode PD.

The switch SW1, the switch SW2, and the switch SW3 are implemented by, for example, MOS transistors. For example, the gate of each MOS transistor can be connected to the SPAD controller 221. In this case, the SPAD controller 221 turns on/off the switch by controlling the voltage applied to the gate of each MOS transistor. Note that the gate of the transistor TR0 may be connected to the SPAD controller 221. In this case, the SPAD controller 221 can control the voltage applied to the gate of the transistor TR0 to adjust the resistance value between the source and the drain of the transistor TR0. Note that the control circuit 220 may perform the above-described control instead of the SPAD controller 221.

The source of the transistor TR0 is connected to the power supply potential Vdd. The switch SW1 is connected between the drain of the transistor TR0 and the cathode of the photodiode PD. A voltage Van is applied to the anode of the photodiode PD. The value of the voltage Van can be determined such that a reverse voltage equal to or higher than the breakdown voltage is applied across the terminals of the photodiode PD. An input terminal of the inverter INV is connected to a cathode of the photodiode PD and the switch SW1 via a signal line Lin.

The source of the transistor TR1 and the source of the transistor TR2 are both connected to the power supply potential Vdd. The switch SW2 is connected between the drain of the transistor TR1 and the signal line Lin. On the other hand, the switch SW3 is connected between the drain of the transistor TR2 and the signal line Lin. The output terminal of the inverter INV is connected to the gate of the transistor TR2 and the input terminal of the pulse generator PG via a signal line Lout. The output terminal of the pulse generator PG is connected to the gate of the transistor TR1.

In the light receiving circuit 10, the method of recharging the photodiode PD can be switched according to the switch setting. When the switch SW1 is turned off and the switch SW2 and the switch SW3 are turned on, the light receiving circuit 10 can be caused to perform active recharge. In the light receiving circuit 10 illustrated in FIG. 5, a switch for performing active recharge is set. Furthermore, when the switch SW1 is turned on and the switch SW2 and the switch SW3 are turned off, the light receiving circuit 10 can be caused to perform passive recharge. In this case, the light receiving circuit 10 operates similarly to the light receiving circuit 13 (passive recharge circuit) in FIG. 3. Moreover, when the switch SW1 and the switch SW2 are turned on, the light receiving circuit 10 can be caused to perform both the active recharge and the active recharge. In this case, the switch SW3 may be ON or OFF.

Figure 6:
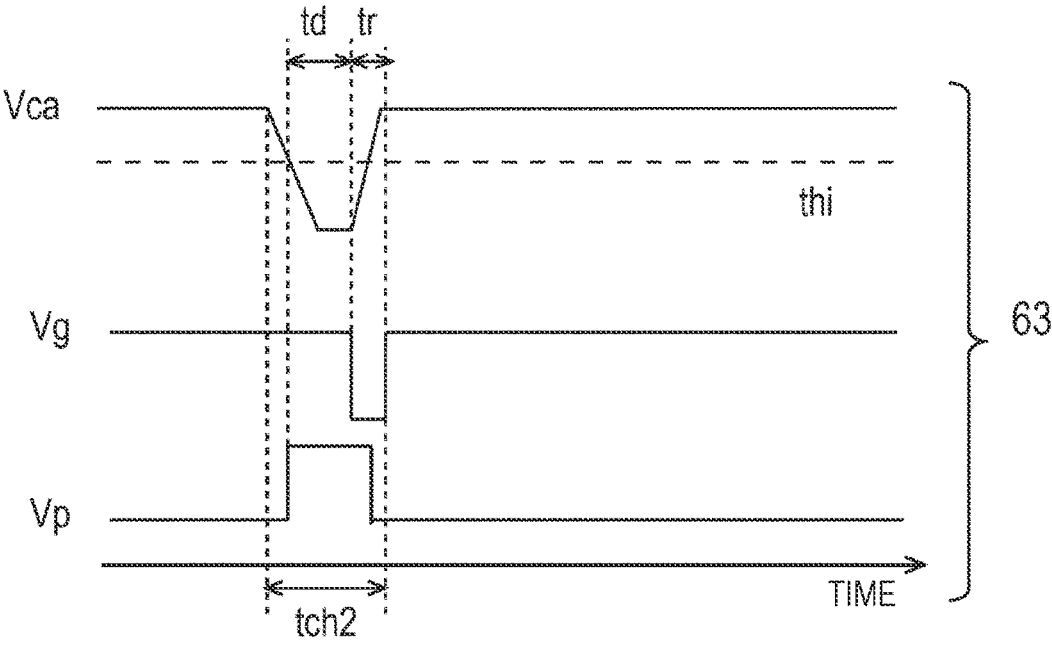
FIG. 6 is a graph illustrating an example of a voltage waveform in the light receiving circuit of FIG. 5.
Figure 6:
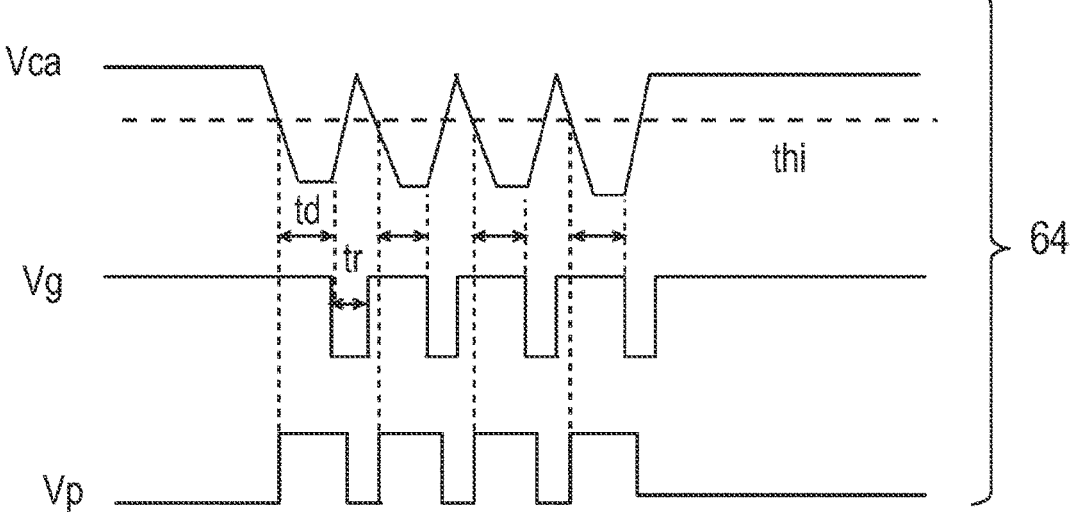

The graph of FIG. 6 illustrates an example of a voltage waveform in the light receiving circuit 10. A graph 63 in FIG. 6 corresponds to a voltage waveform in a case where active recharge is performed by the light receiving circuit 10. Note that Vg in the graph 63 indicates the gate voltage of the transistor TR1. In each graph, the horizontal axis represents time.

An operation when the light receiving circuit 10 is caused to perform active recharge (when the switch is set st1) will be described. When a photon enters the photodiode PD and a current flowing across terminals of the photodiode PD increases due to avalanche multiplication, a cathode potential Vca decreases according to a voltage drop across the source/drain of the transistor TR1 and the transistor TR2. When the voltage across the terminals of the photodiode PD decreases to the breakdown voltage, the avalanche phenomenon stops (quenches) similarly to the case where passive recharge is performed.

The inverter INV outputs a pulse of HIGH (positive polarity) in a period in which the voltage of the signal line Lin is equal to or less than a threshold thi (Vp of the graph 64). A measurement circuit 30 in the subsequent stage can perform various types of processing on the basis of the pulse. Since the voltage of the signal line Lin becomes LOW, the voltage of the signal line Lout on the output side of the inverter INV becomes HIGH. When a HIGH signal is input, the pulse generator PG outputs a LOW (negative polarity) pulse with a time delay td. Accordingly, a voltage of LOW is applied to the gate of the transistor TR1, and the source/drain of the transistor TR1 is turned on. In Vg of the graph 64, the LOW pulse is output over the period tr. As a result, the cathode potential Vca is raised by the power supply potential Vdd, and photons can be detected again by the photodiode PD.

When the voltage of the signal line Lin becomes HIGH by recharge, the voltage of the signal line Lout on the output side of the inverter INV becomes LOW. At this time, a voltage of LOW is applied to the gate of the transistor TR2, and the source/drain of the transistor TR2 is turned on. In this manner, the transistor TR2 latches the state of the transistor TR1. The transistor TR2 can suppress generation of a through current and prevent the cathode potential Vca from being indefinite.

Note that, in a case where not only the switch SW2 and the switch SW3 but also the switch SW1 is turned on (switch setting st3), the voltage drop across the source and the drain of the transistor TR0 further contributes to the quenching of the photodiode PD. When the current flowing between the terminals of the photodiode PD decreases due to the quenching, the voltage across the terminals of the photodiode PD increases similarly to the light receiving circuit 13 in FIG. 3.

As illustrated in the graph 63 of FIG. 6, it is necessary to adjust the value of the time delay td in order to perform the active recharge and shorten the dead time of the photodiode PD. Here, the time delay td refers to a time difference from when the cathode potential Vca of the photodiode PD becomes equal to or less than the threshold thi to when the pulse of LOW is output from the pulse generator PG. A graph 64 of FIG. 6 illustrates a voltage waveform in a case where the time delay td is set too short. If the time delay td is set too short, the cathode potential Vca may decrease again even if a reset pulse is output from the pulse generator PG. The cathode potential Vca is below the threshold thi, and the pulse generator PG generates a plurality of pulses in a short period of time. Therefore, hunting occurs at the cathode potential Vca, and photon detection cannot be performed using the light receiving circuit 10. In order to enhance the distance measurement performance, it is desirable to secure a sufficient value of the time delay td at which the active recharge pulse is generated in the light receiving circuit and to prevent the hunting of the voltage.

In a case where an active recharge circuit is used as the light receiving circuit, it is preferable to set the time delay td at which an active recharge pulse is generated of the light receiving circuit so as to minimize the dead time before starting processing such as distance measurement. For example, in the calibration processing performed at the time of factory shipment, initial startup, or initialization operation of the distance measuring device, it is possible to determine the time delay td at which the active recharge pulse is generated in the light receiving circuit (pixel) in the SPAD array 240, minimize the dead time, and improve the distance measuring performance.

In the light receiving circuit 10, a portion including the transistor TR1, the transistor TR2, the switch SW2, the switch SW3, and the pulse generator PG corresponds to an active recharge circuit 91. Furthermore, in the light receiving circuit 10, a portion including the transistor TR0 (load element 90) and the switch SW1 corresponds to a passive recharge circuit. The light receiving circuit 10 is an example of a light receiving circuit including a passive recharge circuit and an active recharge circuit.

Note that a circuit having a configuration different from that of the light receiving circuit 10 (FIG. 5) may be used. For example, a circuit in which an element is added to the light receiving circuit 10 may be used. Furthermore, a circuit obtained by inverting the polarity of the light receiving circuit 10 may be used. In a case where a circuit whose polarity is inverted is used, the PMOS transistor is replaced with an NMOS transistor. Furthermore, when the polarity of the light receiving circuit 10 is inverted, a positive bias voltage is applied to the cathode of the photodiode PD. Accordingly, the cathode potential of the photodiode PD in the above description is replaced with the anode potential. Note that not only the light receiving circuit 10 but also other circuits described in the present specification can adopt a configuration in which the polarity is inverted.

Figure 7:
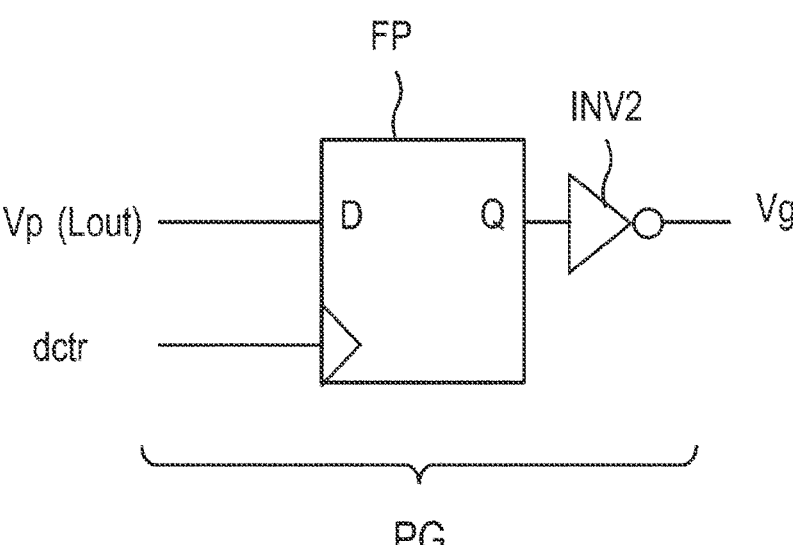
FIG. 7 is a circuit diagram illustrating an example of a configuration of a pulse generator.

The circuit diagram of FIG. 7 illustrates an example of a configuration of a pulse generator. The pulse generator PG of FIG. 7 includes a flip-flop FP and an inverter INV2. The flip-flop FP is a D flip-flop. The signal line Lout is connected to the D terminal of the flip-flop F1. The signal line dctr is connected to the clock terminal of the flip-flop F1. The inverter INV2 is connected between the Q terminal of the flip-flop F1 and the gate of the transistor TR1.

In the pulse generator PG of FIG. 7, by controlling the clock signal supplied to the signal line dctr, the time delay td from when the voltage of the signal line Lout becomes the HIGH level to when the voltage Vg is changed to the LOW level can be changed. For example, when the interval of the pulses in the clock signal is increased, the time delay td can be increased. Furthermore, when the interval of the pulses in the clock signal is reduced, the time delay td can be reduced. When the pulse generator PG of FIG. 7 is used, it is easy to control the time delay by the clock signal supplied from the outside. For example, the SPAD controller 221 or the clock generator 251 may supply a clock signal to the signal line dctr.

Note that the circuit of FIG. 7 is merely an example of the pulse generator PG. Accordingly, a pulse generator having a different configuration may be used. For example, the pulse generator may be implemented by an inverter chain. Furthermore, a pulse generator may be implemented by combining a delay unit and a logical operation element. That is, the pulse generator having any circuit configuration may be used as long as the pulse can be output to the gate of the transistor TR1 with a time delay after the level of the input voltage changes.

Figure 8:
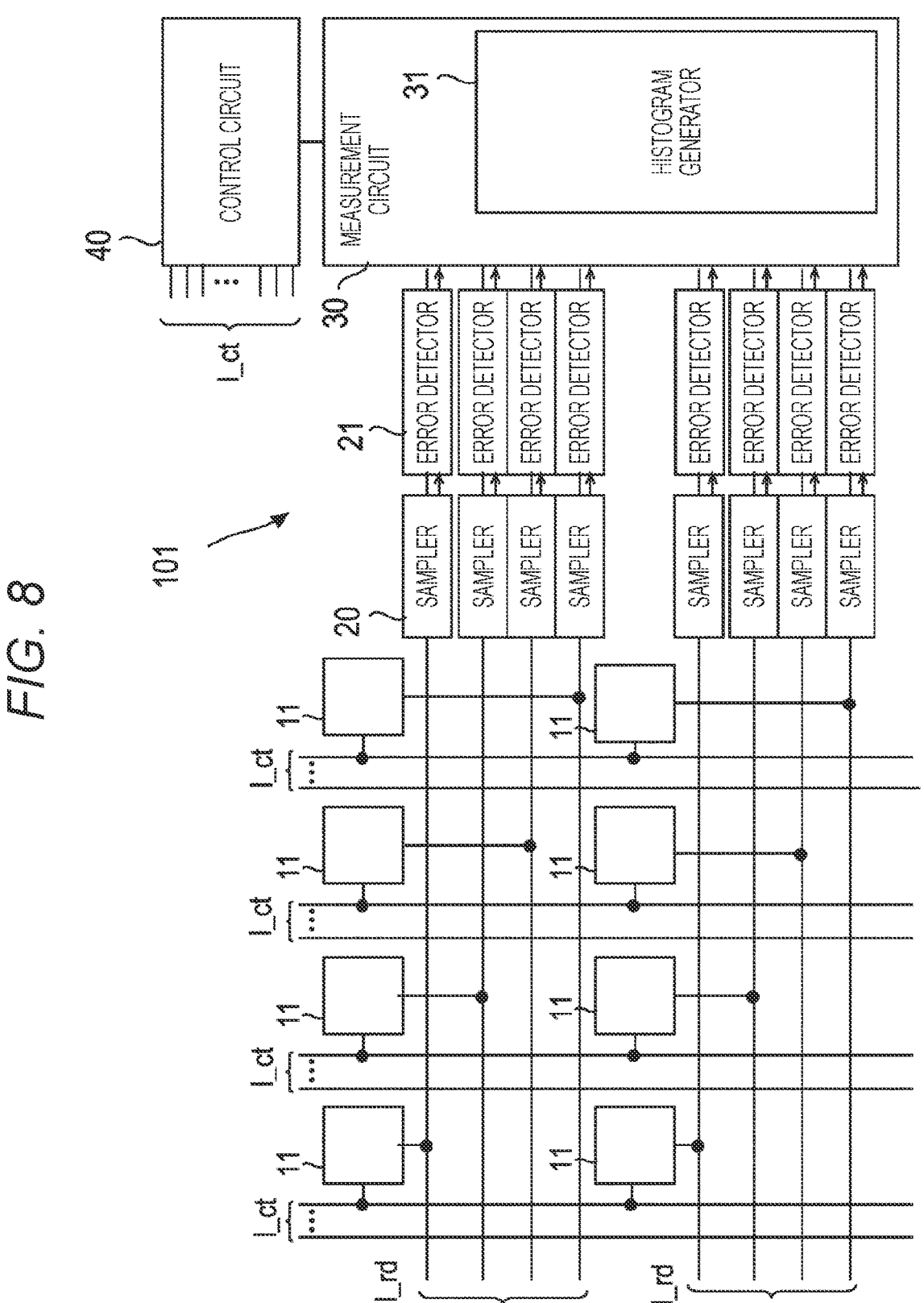
FIG. 8 is a diagram schematically illustrating an example of the light receiving device according to the present disclosure.

FIG. 8 schematically illustrates an example of the light receiving device according to the present disclosure. A light receiving device 101 of FIG. 8 includes a plurality of light receiving circuits 11, a plurality of samplers 20, a plurality of error detectors 21, a measurement circuit 30, and a control circuit 40. The light receiving circuit 11 includes a SPAD and a light receiving circuit. The measurement circuit 30 includes a histogram generator 31 as an internal component.

The plurality of light receiving circuits 11 corresponds to, for example, the SPAD array 240 of the light receiving device 200 (FIG. 1). The plurality of samplers 20 and the plurality of error detectors 21 are arranged in the circuit block 241, for example. The measurement circuit 30 corresponds to, for example, the processing circuit 230. The control circuit 40 corresponds to, for example, the control circuit 220 and the SPAD controller 221.

Each light receiving circuit 11 is connected to the sampler 20 at the subsequent stage via a signal line l_rd. The sampler is also called a buffer, and digitizes a signal input from the light receiving circuit. An output side of each sampler 20 is connected to the error detector 21. Then, the measurement circuit 30 is connected to a subsequent stage of each error detector 21. The measurement circuit 30 is connected to the control circuit 40. The control circuit 40 is connected to each light receiving circuit 11 via the signal line l_ct. Note that, although a plurality of signal lines l_ct is illustrated in FIG. 8, the number of signal lines for control is not limited. For example, the control circuit 40 may control the plurality of light receiving circuits 11 with one signal line. Note that the configuration of the light receiving circuit 11 is not limited. For example, the light receiving circuit illustrated in FIGS. 3 and 5 can be used as the light receiving circuit 11. The light receiving circuit 11 may be a recharge circuit or an active recharge circuit. Furthermore, circuits having different configurations may be mixed in the plurality of light receiving circuits 11.

When the SPAD reacts with a photon, the light receiving circuit 11 outputs a voltage signal to the signal line l_rd. The error detector 21 is configured to perform error detection on the basis of the voltage signal output from the light receiving circuit 11. Furthermore, the sampler 20 digitizes the voltage signal output from the light receiving circuit 11. The histogram generator 31 generates a histogram on the basis of the pulse included in the signal input from each sampler.

Note that the configuration of the light receiving device illustrated in FIG. 8 is merely an example. For example, the error detector 21 may be connected between the light receiving circuit 11 and the sampler 20. Furthermore, a circuit in which the function of the sampler 20 and the function of the error detector 21 are integrated may be connected between each light receiving circuit 11 and the input terminal of the measurement circuit 30. Furthermore, the plurality of signal lines l_rd may be connected to a common error detector without preparing the error detector 21 for each of the signal lines l_rd. In this case, it is necessary for one error detector to perform the error determination of the plurality of signal lines l_rd, but the necessary circuit area can be reduced. Furthermore, a function corresponding to the error detector 21 may be mounted on the measurement circuit 30 side. In this case, it can be said that the measurement circuit 30 has the function of the error detector 21.

Figure 9:
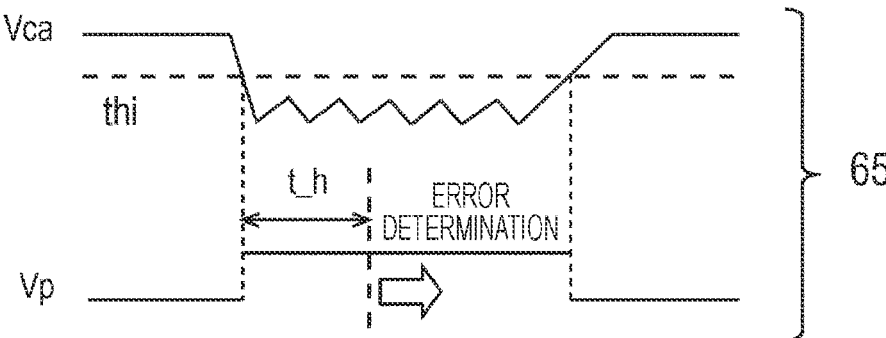
FIG. 9 is a graph illustrating an example of error determination by an error detector.
Figure 9:
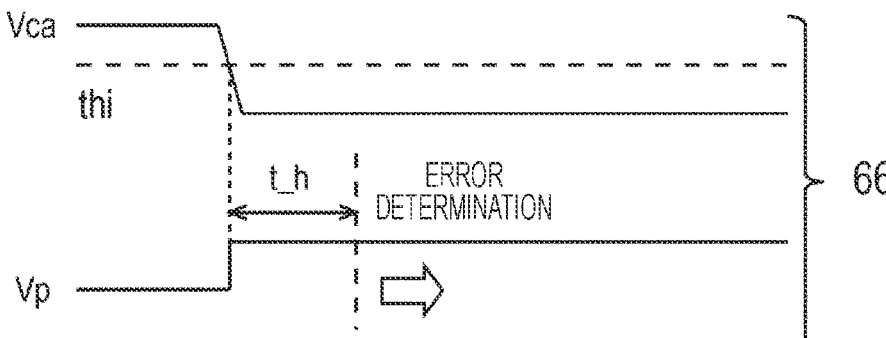
Figure 9:
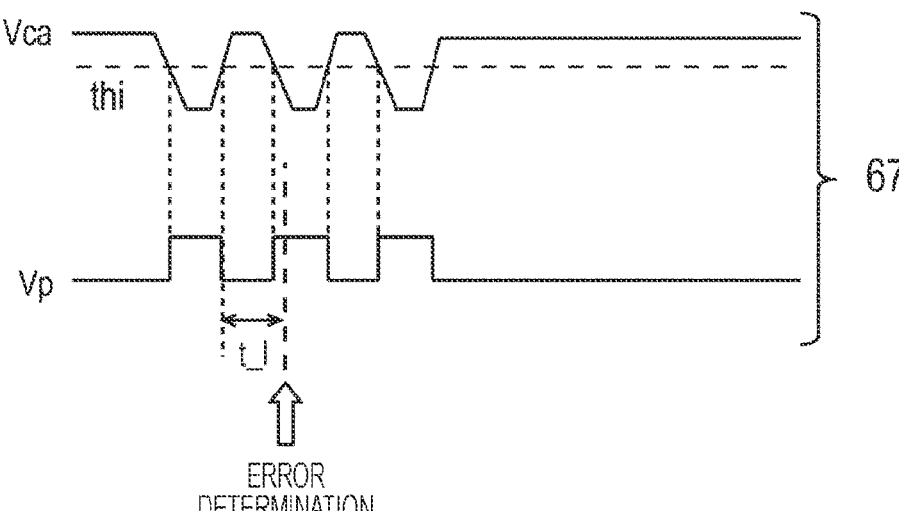

The graph of FIG. 9 illustrates an example of error detection by the error detector 21. The error detector 21 can perform error determination, for example, by a method described below. The graph 65 to 67 of FIG. 9 illustrates waveforms of the cathode potential Vca of the photodiode PD and the output voltage Vp of the light receiving circuit 11 (inverter INV). In each graph, the horizontal axis represents time.

The graph 65 illustrates a case where the photodiode PD reacts again with a photon before the cathode potential Vca rises to a voltage higher than the threshold of the inverter INV, and the pulse width output from the inverter INV becomes too large. For example, the error detector 21 detects a rising of a pulse in the voltage signal output from the light receiving circuit 11. Then, the error detector 21 monitors the pulse width. The error detector 21 makes an error determination in a case where the pulse width exceeds the threshold t_h. For example, the error detector 21 samples the voltage of the signal in a cycle t_s, and can make an error determination when the sampled voltage becomes successively HIGH n_h times consecutively. In this case, the values of t_s and n_h can be set such that the relationship of t_h=t_s×n_h is satisfied. However, error determination may be performed by a method different from this method.

In the graph 66, since the recharge current in the light receiving circuit 11 is too large, the voltage across the terminals of the photodiode PD does not decrease to the breakdown voltage, and the quenching cannot be performed. Therefore, the output voltage of the light receiving circuit 11 sticks. For example, the error detector 21 detects a rising of a pulse in the voltage signal output from the light receiving circuit 11. Then, the error detector 21 measures a period during which the output voltage of the light receiving circuit 11 is HIGH. The error detector 21 makes an error determination when the period during which the output voltage of the light receiving circuit 11 is HIGH exceeds the threshold t_h. In the example of the graph 66, error determination can be performed by a method similar to the case of the graph 65.

In the graph 67, a residual charge is generated in the photodiode PD after the reaction with the photon. Therefore, even if the quenching and recharging operations are performed by the light receiving circuit 11, the photodiode PD reacts again with a photon. Hunting of the cathode potential Vca occurs due to the re-reaction with a photon. For example, the error detector 21 performs the error determination in a case where the period during which the output voltage of the light receiving circuit 11 is LOW is shorter than the threshold t_l after the pulse in the voltage signal of the light receiving circuit 11 falls. For example, the error detector 21 samples the voltage of the signal in the cycle t_s, and performs the error determination in a case where the number of times the sampled voltage successively becomes LOW is less than n_l times. In this case, the values of t_s and n_l can be set such that the relationship of t_l=t_s×n_l is satisfied. Furthermore, error determination may be performed by a method different from this method.

Here, the error determination in a case where the light receiving circuit 11 outputs a pulse at a HIGH level (positive polarity) at the time of photon detection has been described. The error detector 21 can also perform error determination in a case where the light receiving circuit 11 outputs a pulse at a LOW level (negative polarity). In that case, it is sufficient that the error detector 21 performs an operation in which HIGH is replaced with LOW, LOW is replaced with HIGH, falling of the pulse is replaced with rising of the pulse, and rising of the pulse is replaced with falling of the pulse in the above-described description.

In a case where error determination is made, the error detector 21 outputs an error signal to the measurement circuit 30. For example, an error signal may be transmitted using a signal line separate from a signal line through which a pulse is transmitted at the time of photon detection. Furthermore, an error signal may be transmitted by being superimposed on a signal line to which a pulse is transmitted at the time of photon detection. The error detector 21 may output an error signal including an error code indicating the type of the detected error. The error code may include, for example, information indicating (1) an excessively small recharge current, (2) an excessively large recharge current, (3) an excessively short time delay td, and (4) an excessively long time delay td. Furthermore, the error signal may include information specifying the type of the above-described error waveform or information regarding the detected waveform.

Next, an example of processing of searching for a setting that minimizes the dead time by error determination based on voltage signals output from a plurality of pixels (light receiving circuits) in the SPAD array 240 will be described.

Figure 10:
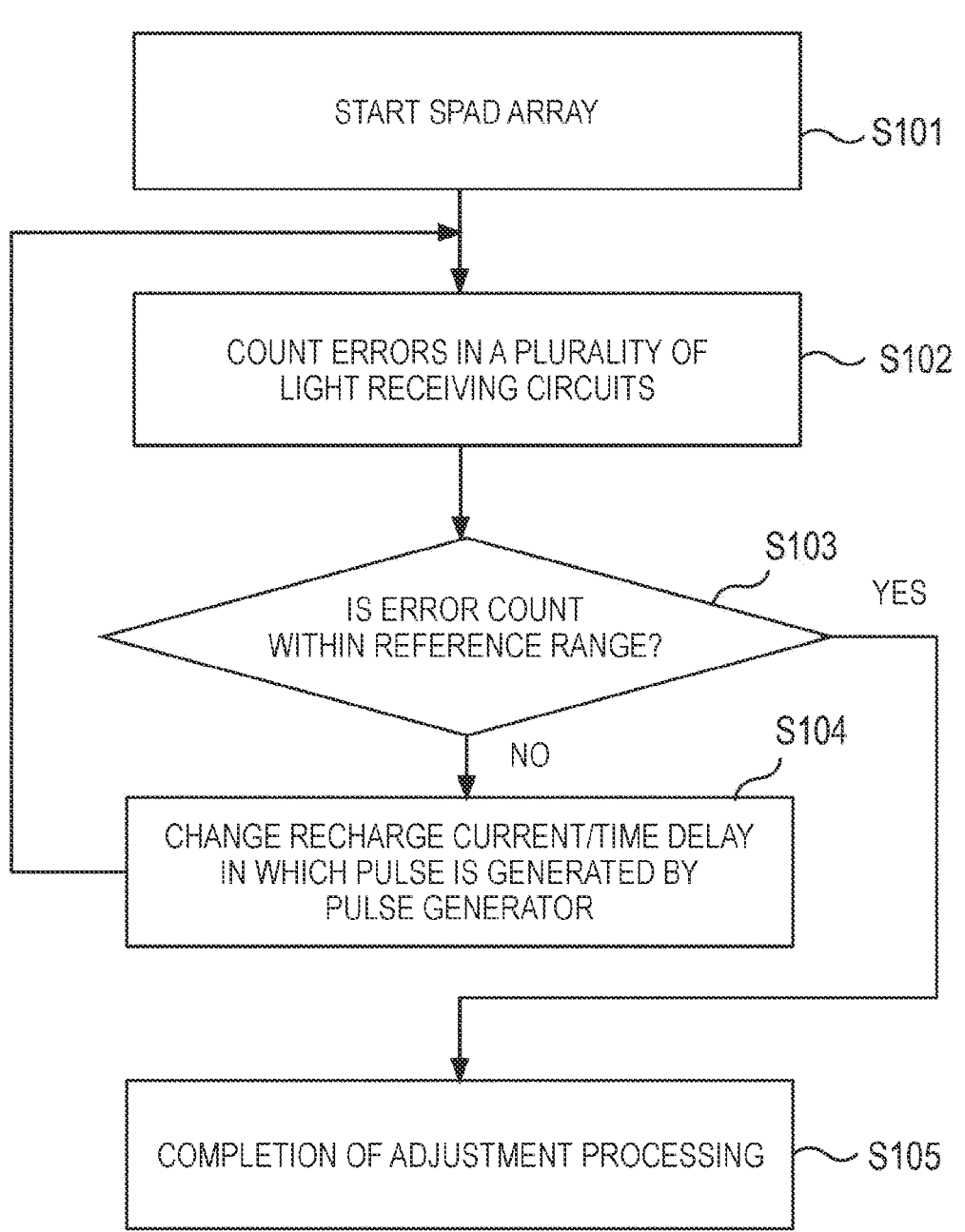
FIG. 10 is a flowchart illustrating an example of processing in the light receiving device or a distance measuring device according to the present disclosure.

The flowchart of FIG. 10 illustrates an example of processing in the light receiving device or a distance measuring device according to the present disclosure. The processing will be described below with reference to the flowchart of FIG. 10.

First, the SPAD array 240 is activated (step S101). Then, the measurement circuit 30 counts errors in the plurality of light receiving circuits in the SPAD array 240 (step S102). The error determination and detection in step S102 are performed by, for example, the error detector 21 or the measurement circuit 30 described above. In a case where the error detector 21 detects an error, the measurement circuit 30 at the subsequent stage can obtain information on the number of error determinations in the SPAD array 240 by an error signal. Here, the measurement circuit 30 may count the number of error determinations for each error code.

For example, information including at least one of the number of error determinations in the SPAD array 240 and the number of error determinations for each error code is referred to as error information. The error information obtained by the measurement circuit 30 is transferred to the control circuit 40 (control circuit 220). In a case where the distance measuring device including the light emitting element is used, the light emission of the light emitting element is stopped during the execution period of step S102, and the influence from the light emitting element can be removed.

The control circuit 40 determines whether or not the error count is within a reference range (step S103). For example, the control circuit 40 may determine whether or not the number of error determinations in the SPAD array 240 is less than a threshold. Furthermore, the control circuit 40 may compare the number of error determinations for each error code with a threshold and determine whether or not the error count falls within a reference range. Accordingly, the adjustment content to be performed next can be specified.

The processing to be performed branches depending on the determination result in step S103. In a case where the control circuit 40 determines that the error count is within the reference range (YES in step S103), the adjustment processing is completed (step S105). After step S205, the distance measuring device may start the distance measuring processing by irradiating the object OBJ with light from the light emitting element.

In a case where the control circuit 40 determines that error count is outside the reference range (NO in step S103), the control circuit 40 changes at least one of the recharge current and/or the time delay at which the pulse is generated by the pulse generator PG (step S104). Examples of the case where the determination in step S103 is negative include a case where the number of error determinations is larger than a threshold or a case where the number of error determinations of a specific error code is larger than a threshold. The adjustment content in step S104 depends on the type of the light receiving circuit in the SPAD array 240. For example, in a case where the light receiving circuit is a passive recharge circuit, the recharge current is adjusted. Furthermore, in a case where the light receiving circuit is a passive recharge circuit, the time delay td at which the pulse is generated by the pulse generator PG is adjusted. The SPAD controller 221 can change the setting of each light receiving circuit in the SPAD array 240. In this case, the control circuit 40 may notify the SPAD controller 221 of the address of the pixel (light receiving circuit) whose setting is to be changed and the setting contents.

For example, in a case where it is determined that the magnitude of the recharge current is insufficient, the control circuit 40 can adjust the recharge current in the light receiving circuit to be larger. In this case, the control circuit 40 may adjust the resistance value in the load element or the load circuit to be smaller. Furthermore, in a case where it is determined that the recharge current is excessive, the control circuit 40 can adjust the recharge current in the light receiving circuit to be smaller. In this case, the control circuit 40 may adjust the resistance value in the load element or the load circuit to be smaller.

Furthermore, in a case where it is determined that the time delay td at which the pulse is generated by the pulse generator PG is too short, the control circuit 40 can adjust the time delay td to be longer. In a case where it is determined that the time delay td at which the pulse is generated in the pulse generator PG is too long, the control circuit 40 can adjust the time delay td to be shorter.

When the processing in step S104 is completed, the processing in steps S102 and S103 is performed again. That is, the errors in the plurality of light receiving circuits are counted again, and it is determined whether or not the error count is within the reference range. When the error count is within the reference range (YES in step S103), the adjustment processing is completed (step S105). After step S105, the distance measuring device may start the distance measuring processing by irradiating the object OBJ with light from the light emitting element.

The execution timing of the above-described processing of FIG. 10 is not limited to the time of calibration of the device. Accordingly, the processing of FIG. 10 may be performed at timing other than the time of calibration of the device. For example, the processing of FIG. 10 may be performed after the operation of the device is started.

A table T1 of FIG. 11 illustrates the number of error determinations when the recharge current of each value is used in the light receiving circuit in the SPAD array 240. For example, the measurement circuit 30 or the control circuit 40 measures the number of error determinations using different recharge currents and generates the table T1. Referring to FIG. 11, the number of error determinations decreases when the recharge current is suppressed. For example, the control circuit 40 may adjust the recharge current on the basis of a threshold $th_e$ of the number of error determinations. In this case, the control circuit 40 compares the number of error determinations eel when a recharge current $i_{c1}$ is used with the threshold $th_e$. In a case where $e_{e1} > th_e$, the control circuit 40 changes the recharge current to $i_{c2}$ ($i_{c1} \neq i_{c2}$). The control circuit 40 can determine whether to use $i_{c2}$ larger than $i_{c1}$ or $i_{c2}$ smaller than $i_{c1}$ on the basis of the information on the error code. Then, when the control circuit 40 determines that the number of error determinations is smaller than the threshold, distance measurement can be performed using the recharge current at that time.

For example, in a case where data of the table T1 is obtained in the adjustment processing, the number of error determinations 3 can be used as the threshold $th_e$. However, the threshold may be different from this. Note that the current values included in the table of FIG. 11 are merely examples, and are not intended to limit the value of the recharge current used in the light receiving circuit.

Note that in a case where the number of error determinations is measured using different recharge currents, the measurement of the number of error determinations may be started from the maximum value $i_{max}$ of the recharge current that can be set in the light receiving circuit, or the measurement of the number of error determinations may be started from the minimum value $i_{min}$ of the recharge current that can be set in the light receiving circuit. Furthermore, the measurement of the number of error determinations may be started from a recharge current having a value between $i_{max}$ and $i_{min}$. That is, the recharge current at the start of the adjustment processing is not limited.

The control circuit 40 may continue the adjustment processing after the number of error determinations becomes smaller than the threshold $th_e$. For example, in a case where it is desired to use a recharge current as large as possible to shorten the dead time, the number of error determinations can be counted using a larger recharge current, and the number of error determinations can be compared with the threshold $th_e$. In a case where the number of error determinations is smaller than the threshold $th_e$ even after the change of the recharge current, distance measurement can be performed using a larger recharge current. Furthermore, in a case where it is desired to use a smaller recharge current to suppress the power consumption, the number of error determinations can be counted using a smaller recharge current, and the number of error determinations can be compared with the threshold $th_e$. In a case where the number of error determinations is smaller than the threshold $th_e$ even after the change of the recharge current, distance measurement can be performed using a smaller recharge current.

A table T2 of FIG. 11 illustrates the number of error determinations when the recharge current of each value is used in the light receiving circuit in the SPAD array 240. For example, the measurement circuit 30 or the control circuit 40 measures the number of error determinations using different time delay td and generates the table T2. Referring to FIG. 11, in a case where the pulse generator PG generates a pulse with a shorter time delay td, the number of error determinations is reduced. For example, the control circuit 40 may adjust the time delay td on the basis of a threshold $th_e$ of the number of error determinations. In this case, the control circuit 40 compares the number of error determinations $e_{d1}$ when a time delay $td_1$ is used with the threshold $th_e$. In a case where $e_{d1} > th_e$, the control circuit 40 changes the time delay to $td_2$ ($td_1 \neq td_2$). The control circuit 40 can determine whether to use $td_2$ larger than $td_1$ or $td_2$ smaller than $td_1$ on the basis of the information on the error code. Then, when the control circuit 40 determines that the number of error determinations is smaller than the threshold, it is possible to generate an active recharge pulse at a time delay at that time and perform distance measurement.

For example, in a case where data of the table T2 is obtained in the adjustment processing, the number of error determinations 3 can be used as the threshold $th_e$. However, the threshold may be different from this. Note that the value of the time delay included in the table of FIG. 11 is merely an example, and is not intended to limit the value of the time delay at which the pulse is generated.

Note that in a case where the number of error determinations is measured using different recharge currents, the measurement of the number of error determinations may be started from the minimum value $td_{min}$ of the time delay that can be set in the pulse generator PG, or the measurement of the number of error determinations may be started from the minimum value $td_{max}$ of the time delay that can be set in the pulse generator PG. Furthermore, the measurement of the number of error determinations may be started from a time delay value of a value between $td_{min}$ and $td_{max}$. That is, the time delay at the start of the adjustment processing is not limited.

The control circuit 40 may continue the adjustment processing after the number of error determinations becomes smaller than the threshold $th_e$. For example, in a case where it is desired to use a time delay as short as possible to shorten the dead time, the number of error determinations can be counted using a shorter time delay, and the number of error determinations can be compared with the threshold $th_e$. In a case where the number of error determinations is smaller than the threshold $th_e$ even after the change to the shorter time delay, distance measurement can be performed using a further smaller time delay. Furthermore, in a case where it is desired to use a time delay as long as possible to suppress the power consumption, the number of error determinations can be counted using a longer time delay, and the number of error determinations can be compared with the threshold $th_e$.

In a case where the number of error determinations is smaller than the threshold the even after the change of the time delay, distance measurement can be performed using a further longer time delay.

Next, an example of a load circuit that can be used in the light receiving device, the distance measuring device, and the light receiving circuit according to the present disclosure will be described.

FIGS. 3 and 5 illustrate examples of the light receiving circuit in which the transistor TR0 is used as the load element 90 that controls the recharge current. However, in order to control the recharge current with higher accuracy, a load circuit including a plurality of elements may be used instead of the load element 90. An example of a load circuit capable of controlling a resistance value or a recharge current will be described below.

Figure 12:
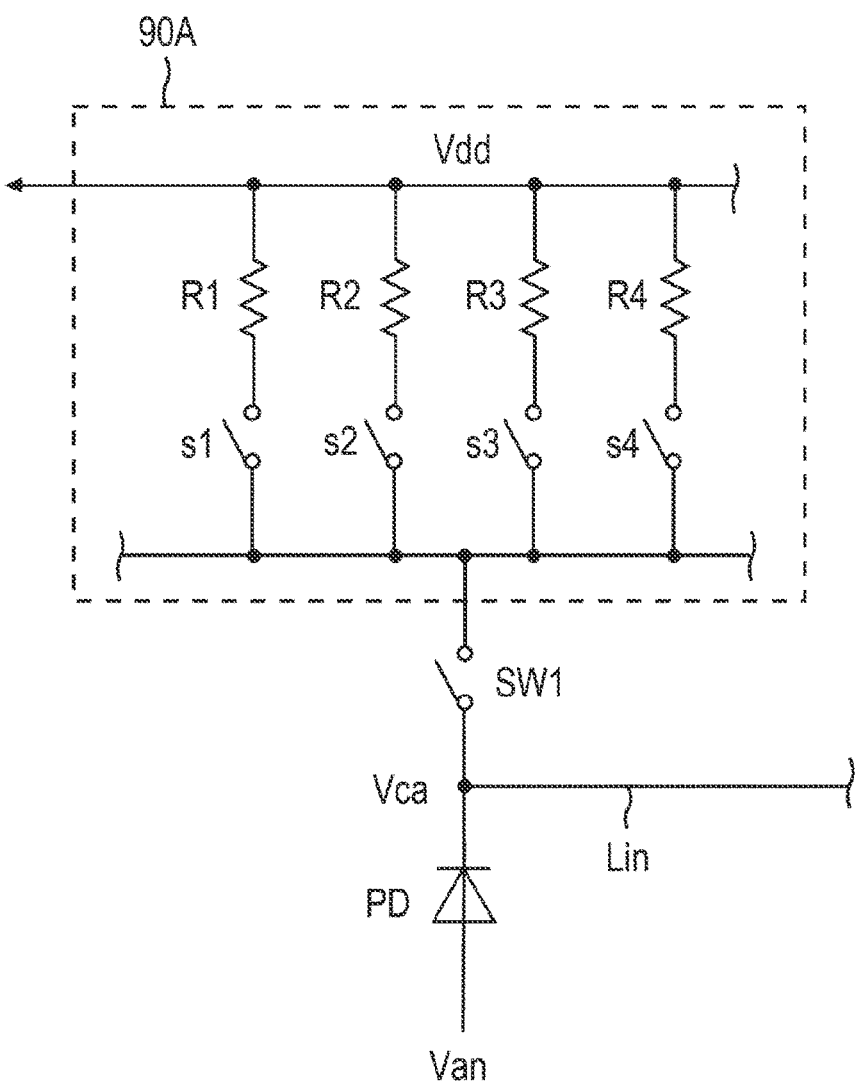
FIG. 12 is a circuit diagram illustrating an example of a load circuit whose resistance value can be adjusted.

The circuit diagram of FIG. 12 illustrates an example of a load circuit whose resistance value can be adjusted. FIG. 12 illustrates a load circuit 90A connected to the light receiving circuit. The load circuit 90A is connected to a cathode of a photodiode PD and a signal line Lin via a switch SW1. For example, the transistor TR0 in the circuit diagrams of FIGS. 3 and 5 can be replaced with the load circuit 90A. The switch SW1 is a switch for switching enable/disable of passive recharge. In a case where the passive recharge is not disabled in the light receiving circuit, the switch SW1 may be omitted, and the load circuit 90A may be directly connected to the cathode of the photodiode PD and the signal line Lin.

The load circuit 90A includes a plurality of pairs of resistors and switches connected in series. A resistor R1 is connected in series with a paired switch s1. Furthermore, a resistor R2 is connected in series with a paired switch s2. A resistor R3 is connected in series with a paired switch s3. A resistor R4 is similarly connected in series with a paired switch s4. The load circuit 90A of FIG. 12 includes four pairs of resistors and switches. However, the number of pairs of resistors and switches included in the load circuit may be different from this. For example, a load circuit can be used in which the number of resistor-switch pairs is any integer equal to or greater than two. Furthermore, the resistor and the switch as the pair are connected in parallel to each other. A power supply potential Vdd is applied to an end point opposite to the photodiode PD of each pair.

It is assumed that the switches s1 to s4 in the load circuit 90A are switched by a circuit that controls the SPAD array 240. For example, the switches s1 to s4 are turned on/off by at least one of the control circuit 40, the control circuit 220, the SPAD controller 221, and the external processing circuit 300. The switches s1 to s4 are implemented by, for example, MOS transistors. However, a mounting method of the switches s1 to s4 is not limited.

In the load circuit 90A, the resistance value can be adjusted according to the number of switches to be turned on. When the number of switches to be turned on is increased, the number of resistors connected in parallel is increased, so that the resistance value of the load circuit 90A decreases. For example, it is assumed that the resistance values of the resistors R1 to R4 are equal. In this case, when two switches are turned on, the resistance value of the load circuit 90A becomes ½ as compared with a case where one switch is turned on. As similar to this, when three switches are turned on, the resistance value of the load circuit 90A becomes ⅓ as compared with a case where one switch is turned on. Moreover, when four switches are turned on, the resistance value of the load circuit 90A becomes ¼ as compared with a case where one switch is turned on.

Note that the resistance values of the plurality of resistors of the load circuit may not necessarily be equal to each other. Accordingly, the load circuit may include resistors having different resistance values.

In a case where the same power supply potential Vdd is used, increasing the resistance value of the load circuit 90A decreases the recharge current. Furthermore, when the resistance value of the load circuit 90A is reduced, the recharge current can be increased. As described above, in the light receiving device, the light receiving circuit, and the distance measuring device according to the present disclosure, the recharge current may be adjusted by changing the number of switches to be turned on in the load circuit 90A. When the load circuit 90A is used, the recharge current can be adjusted with high accuracy.

As shown in the example of FIG. 12, the light receiving circuit according to the present disclosure may include: a light receiving element; a plurality of resistors connected in parallel between a reference potential and the light receiving element; a plurality of switches each connected in series with the resistor; and a readout circuit configured to generate a pulse when the light receiving element reacts with a photon. The light receiving circuit according to the present disclosure may be configured such that a current supplied to the light receiving element is adjusted according to switching of the switches. The above-described power supply potential Vdd is an example of a reference potential. The above-described photodiode PD is an example of a light receiving element. The readout circuit corresponds to, for example, a portion of the circuit illustrated in FIGS. 3 and 5 excluding the transistor TR0, the switch SW1, and the photodiode PD.

Figure 13:
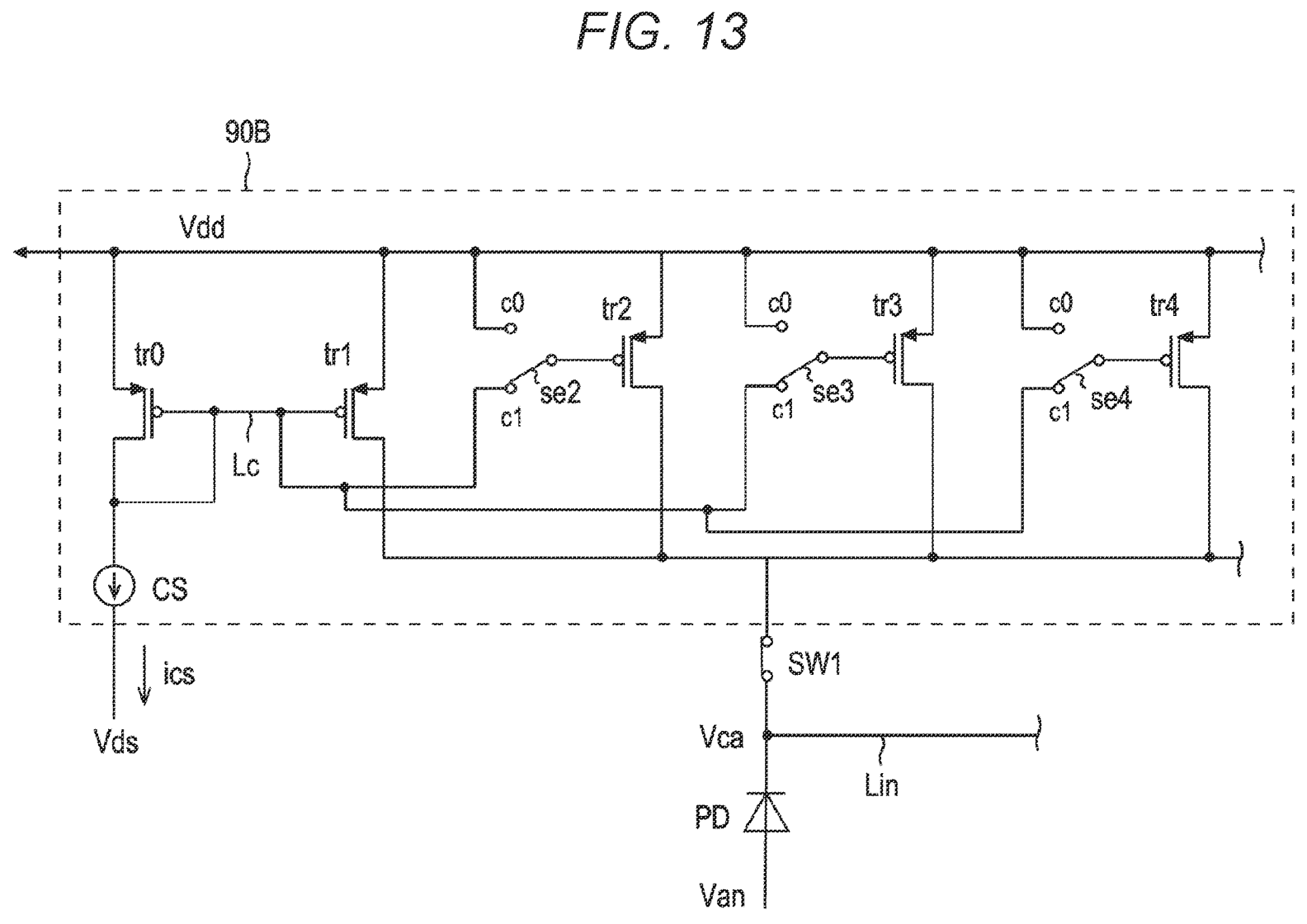

The circuit diagram of FIG. 13 illustrates an example of a load circuit whose current value can be adjusted. FIG. 13 illustrates a load circuit 90B connected to the light receiving circuit. The load circuit 90B is connected to a cathode of a photodiode PD and a signal line Lin via a switch SW1. For example, the transistor TR0 in the circuit diagrams of FIGS. 3 and 5 can be replaced with the load circuit 90B. The switch SW1 is a switch for switching enable/disable of passive recharge. In a case where the passive recharge is not disabled in the light receiving circuit, the switch SW1 may be omitted, and the load circuit 90B may be directly connected to the cathode of the photodiode PD and the signal line Lin. The load circuit 90B will be described below assuming that the switch SW1 is turned on.

The load circuit 90B includes a current source CS, a transistor tr0, a transistor tr1, a transistor tr3, a transistor tr4, a switch se2, a switch se3, and a switch se4. As the current source CS, a current source transistor can be used. As the current source transistor, a MOS transistor can be used. However, a mounting method of the current source CS is not limited. The current source CS may be a constant current source. The transistors tr0 to tr4 are PMOS transistors. The switches se2 to se4 are switches capable of switching the electrical connection destination between the contact c0 and the contact c1.

Each of the sources of the transistors tr0 to tr4 is connected to the power supply potential Vdd. Furthermore, the drains of the transistors tr2 to tr4 are connected to the photodiode PD and the signal line Lin via the switch SW1. The transistors tr0 and tr1 form a current mirror circuit that mirrors a current ics between the power supply potential Vdd and the current source CS. Therefore, the gate and the drain of the transistor tr0 are short-circuited. Furthermore, the gate of the transistor tr0 is connected to the gate of the transistor tr1 via the signal line Lc.

The switch se2 is connected to the gate of the transistor tr2. Furthermore, the switch se3 is connected to the gate of the transistor tr3. Moreover, the switch se4 is connected to the gate of the transistor tr4. The contacts c0 of the switches se2 to se4 are all connected to the power supply potential Vdd. Furthermore, the contacts c1 of the switches se2 to se4 are all connected to the signal line Lc.

It is assumed that the switches se2 to se4 in the load circuit 90B can be switched by a circuit that controls the SPAD array 240. For example, the switches se2 to se4 are switched by at least one of the control circuit 40, the control circuit 220, the SPAD controller 221, and the external processing circuit 300.

The load circuit 90B of FIG. 13 includes three pairs of a transistor and a switch connected to the gate of the transistor. However, the number of pairs of transistors and switches may be different from this. For example, the load circuit may include any number of pairs of transistors and switches, such as one or more. In a case where a pair of a transistor and a switch is added to the circuit of FIG. 13, wiring of the additional transistor and switch follows an existing transistor and switch wiring method. In a case where a switch is added, a contact c0 is connected to the power supply potential Vdd, and a contact c1 is connected to the signal line Lc. Furthermore, in a case where a transistor is added, the gate is connected to the switch, the source is connected to the power supply potential Vdd, and the drain is connected to the drain of another transistor.

In the load circuit 90B, the current value can be adjusted according to the number of switches in which the contact c1 side is turned on. For example, in a case where the number of switches in which the contact c1 side is turned on is zero, a recharge current equal to the current ics of the current source CS is supplied to the light receiving circuit. In a case where there is one switch in which the contact c1 side is turned on, a recharge current twice (2×ics) the current of the current source CS is supplied to the light receiving circuit. Furthermore, in a case where there are two switches in which the contact c1 side is turned on, a recharge current three times (3×ics) the current of the current source CS is supplied to the light receiving circuit. Moreover, in a case where there are three switches in which the contact c2 side is turned on, a recharge current four times (4×ics) the current of the current source CS is supplied to the light receiving circuit. As described above, in the light receiving device, the light receiving circuit, and the distance measuring device according to the present disclosure, the recharge current may be adjusted by changing the number of switches in which the contact c1 side is turned on in the load circuit 90B. When the load circuit 90B is used, the recharge current can be adjusted with high accuracy.

Note that, in a case where the photon detection is performed using the circuit in which the polarity of the light receiving circuit is inverted, the polarity of load circuit 90B may be inverted. By replacing the PMOS transistor in FIG. 13 with an NMOS transistor, it is possible to invert the polarity of the load circuit 90B.

As shown in the example of FIG. 13, the light receiving circuit according to the present disclosure may include a light receiving element, a current source, a switch, a current mirror circuit, and a transistor. The switch can turn on either the first contact side connected to the reference potential or the second contact side connected to the light receiving element. The current mirror circuit is configured to supply, from the output side, a second current obtained by mirroring a first current flowing between the reference potential and the current source. In the transistor, a first signal electrode is connected to the reference potential, a second signal electrode is connected to the output side of the light receiving element and the current mirror circuit, and a control electrode is connected to the switch.

Here, the first contact corresponds to, for example, the contact c0 in the switches se2 to se4 described above. The second contact corresponds to, for example, the contact c1 in the switches se2 to se4 described above. The current mirror circuit is, for example, a current mirror circuit formed by the above-described transistor tr0 and transistor tr1. The output side of the current mirror circuit corresponds to, for example, the drain of the transistor tr1. The first signal electrode is, for example, a source of a MOS transistor. The second signal electrode is, for example, a drain of a MOS transistor. However, the correspondence relationship among the first signal electrode, the second signal electrode, and the electrode of the MOS transistor may be inverted. The control electrode is, for example, a gate of a MOS transistor.

Furthermore, as illustrated in the example of FIG. 13, the light receiving circuit according to the present disclosure may include a plurality of switches and transistors. The light receiving circuit according to the present disclosure may be configured such that a third current obtained by multiplying the first current by N (N is a positive integer) is supplied to the light receiving element in response to switching of the switch. Furthermore, the light receiving circuit according to the present disclosure may further include a readout circuit configured to generate a pulse when the light receiving element reacts with a photon.

When the SPAD recharging method is controlled, the power supply potential Vdd used in the light receiving circuit may be changed. The recharge current at the time of passive recharge can be adjusted by changing the power supply potential Vdd. In a case where a common power supply potential is supplied to the pixels in the SPAD array, the setting of the recharge current of all the pixels in the SPAD array can be changed in a short time. However, a light receiving device and a distance measuring device having a configuration in which a common power supply potential is not supplied to the pixels in the SPAD array may be used. For example, a plurality of power supply circuits may be used to supply the power supply potential to the pixels in the SPAD array.

In the light receiving device and the distance measuring device according to the present disclosure, a power supply circuit capable of adjusting the value of the power supply potential Vdd and the above-described load circuit 90A or 90B may be used in combination. By using a combination of a plurality of components, it is possible to set a recharge current value in a wide range in the light receiving circuit.

By optimizing the setting of the load circuit and the setting of the power supply circuit, it is possible to minimize the dead time in the light receiving device or the distance measuring device. Hereinafter, an example of processing of determining the setting of the load circuit and the setting of the power supply circuit will be described.

Figure 14:
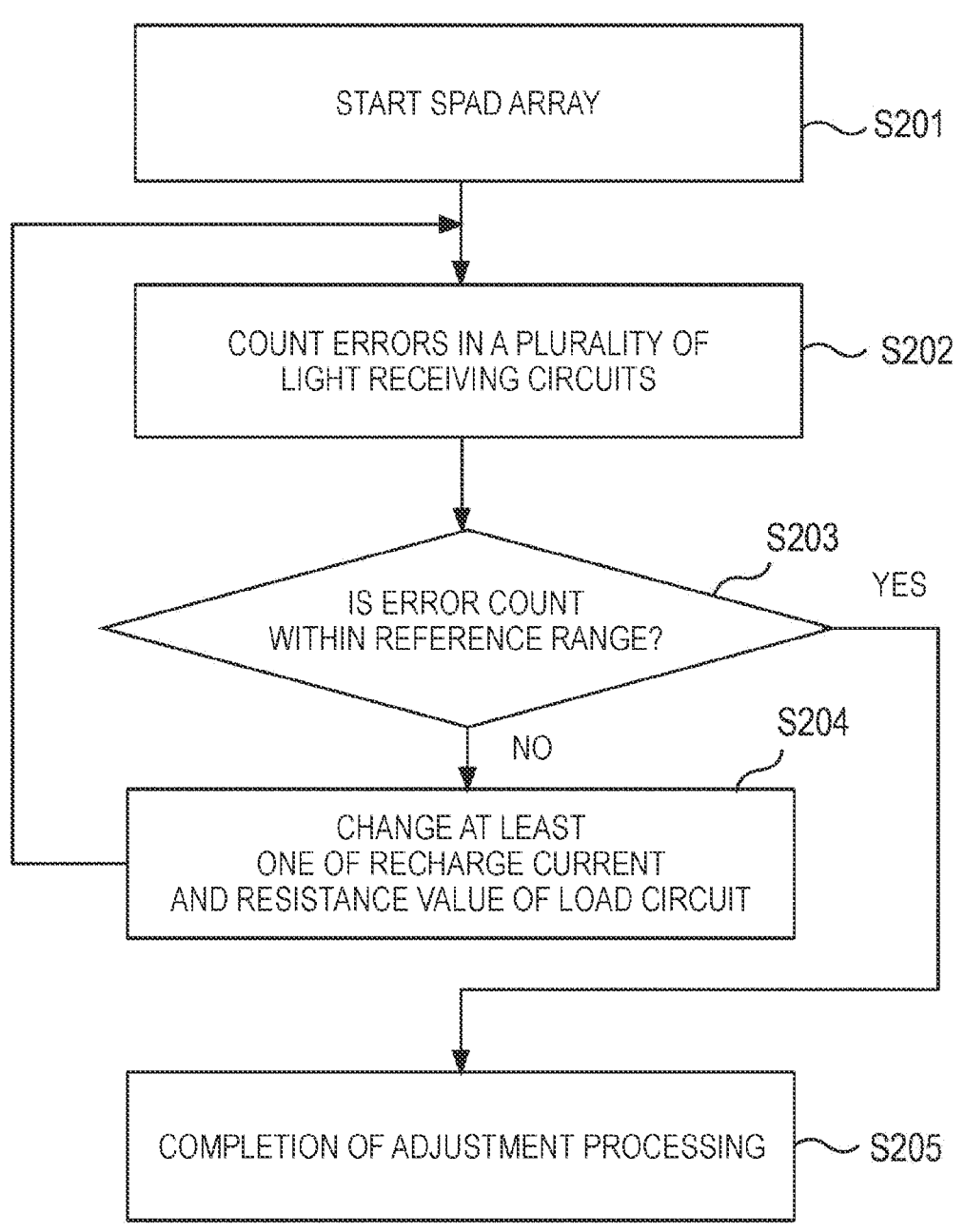
FIG. 14 is a flowchart illustrating an example of processing of determining a setting of a load circuit.

The flowchart of FIG. 14 illustrates an example of processing of determining a setting of a load circuit. The processing will be described below with reference to the flowchart of FIG. 14.

First, the SPAD array 240 is activated (step S201). Then, the measurement circuit 30 counts errors in the plurality of light receiving circuits in the SPAD array 240 (step S202). The error determination and detection in step S202 are performed by, for example, the error detector 21 or the measurement circuit 30 described above. In a case where the error detector 21 detects an error, the measurement circuit 30 at the subsequent stage can obtain information on the number of error determinations in the SPAD array 240 by an error signal. Here, the measurement circuit 30 may count the number of error determinations for each error code specifying the type of error.

For example, information including at least one of the number of error determinations in the SPAD array 240 and the number of error determinations for each error code is referred to as error information. The error information obtained by the measurement circuit 30 is transferred to the control circuit 40 (control circuit 220). In a case where the distance measuring device including the light emitting element is used, the light emission of the light emitting element is stopped during the execution period of step S202. This makes it possible to eliminate the influence of the light emitting element.

The control circuit 40 determines whether or not the error count is within a reference range (step S203). For example, the control circuit 40 may determine whether or not the number of error determinations in the SPAD array 240 is less than a threshold. Furthermore, the control circuit 40 may compare the number of error determinations for each error code with a threshold and determine whether or not the error count falls within a reference range. For example, the control circuit 40 can estimate whether the recharge current is excessively small or the recharge current is excessively large on the basis of the number of error determinations and the error code in step S203.

The processing to be performed branches depending on the determination result in step S203. In a case where the control circuit 40 determines that the error count is within the reference range (YES in step S203), the adjustment processing is completed (step S205). After step S205, the distance measuring device may start the distance measuring processing by irradiating the object OBJ with light from the light emitting element.

In a case where the control circuit 40 determines that the error count is outside the reference range (NO in step S203), the control circuit 40 changes at least one of the recharge current or the resistance value of the load circuit (step S204). Examples of the case where the determination in step S203 is negative include a case where the number of error determinations is larger than a threshold or a case where the number of error determinations of a specific error code is larger than a threshold. As described above, the SPAD controller 221 may change the setting of each light receiving circuit in the SPAD array 240. In this case, the control circuit 40 may notify the SPAD controller 221 of the address of the pixel (light receiving circuit) whose setting is to be changed and the setting contents.

For example, in a case where it is determined that the magnitude of the recharge current is insufficient, the control circuit 40 can change the recharge current in the light receiving circuit to be larger. In this case, the control circuit 40 may change the resistance value in the load circuit to be smaller. As the load circuit, for example, the load circuit 90A in FIG. 12 or the load circuit 90B in FIG. 13 can be used. Furthermore, in a case where the phenomenon illustrated in the graph 62 of FIG. 4 is detected in the light receiving circuit in the SPAD array 240 and it is determined that the recharge current is too large, the control circuit 40 can change the recharge current in the light receiving circuit to be smaller. In this case, the control circuit 40 may change the resistance value in the load circuit to be larger.

When the processing in step S204 is completed, the processing in steps S202 and S203 is performed again. That is, the errors in the plurality of light receiving circuits are counted again, and it is determined whether or not the error count is within the reference range. When the error count is within the reference range (YES in step S203), the calibration processing is completed (step S205). After step S205, the distance measuring device may start the distance measuring processing by irradiating the object OBJ with light from the light emitting element.

The execution timing of the above-described processing of FIG. 14 is not limited to the time of calibration of the device. Accordingly, the processing of FIG. 14 may be performed at timing other than the time of calibration of the device. For example, after the operation of the device is started, the resistance value in the load circuit 90A of FIG. 12 may be adjusted.

Figures 15, 16:
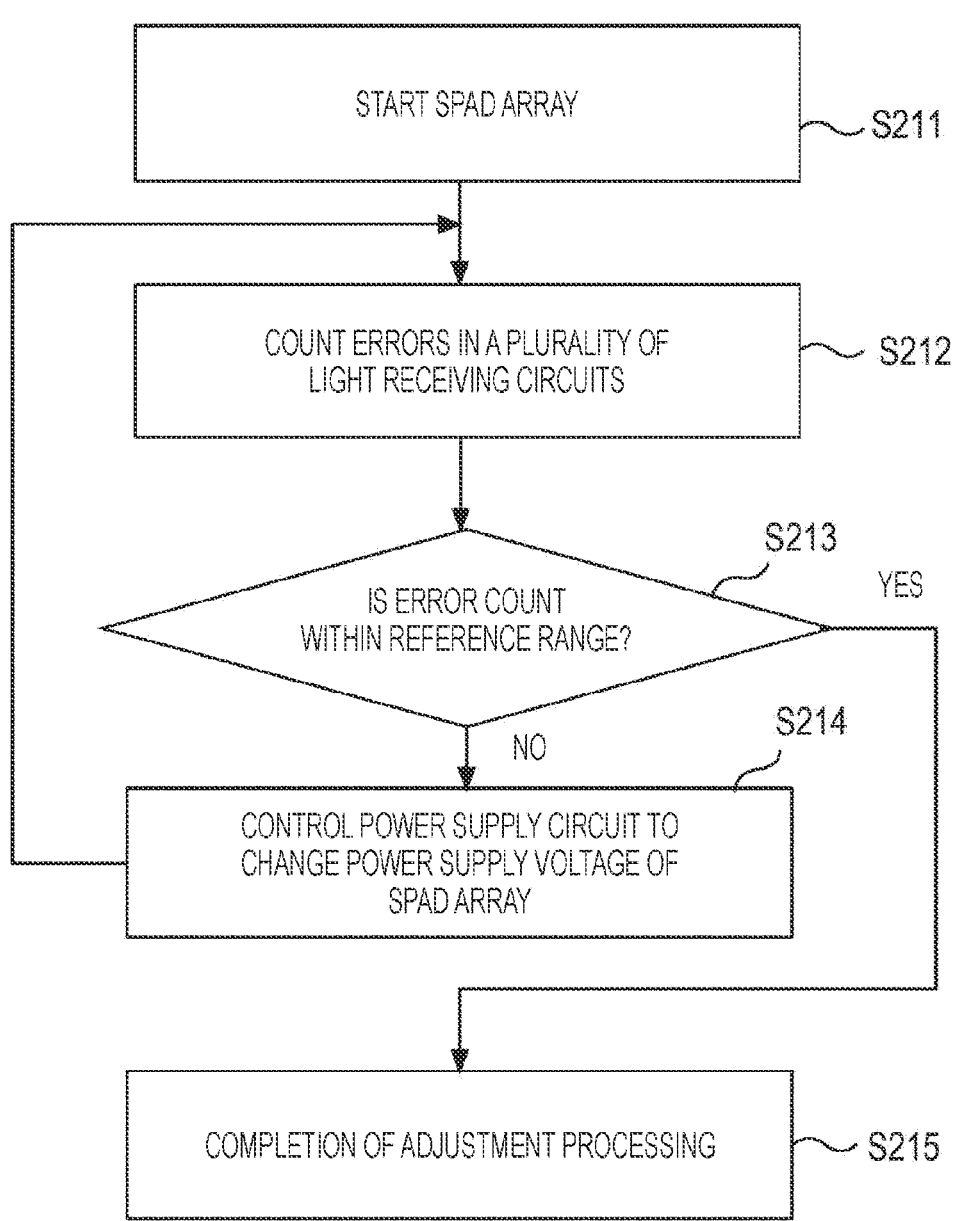
FIG. 15 is a flowchart illustrating an example of processing of determining a setting of a power supply circuit.
FIG. 16 is a table illustrating an example of a power supply potential and the number of error determinations.

The flowchart of FIG. 15 illustrates an example of processing of determining a setting of a power supply circuit. The processing will be described below with reference to the flowchart of FIG. 15.

First, the SPAD array 240 is activated (step S211). Then, the measurement circuit 30 counts errors in the plurality of light receiving circuits in the SPAD array 240 (step S212). The error determination and detection in step S212 are performed by, for example, the error detector 21 or the measurement circuit 30 described above. In a case where the error detector 21 detects an error, the measurement circuit 30 at the subsequent stage can obtain error information in the SPAD array 240 by an error signal.

The error information obtained by the measurement circuit 30 is transferred to the control circuit 40 (control circuit 220). In a case where the distance measuring device including the light emitting element is used, the light emission of the light emitting element is stopped in step S202. This makes it possible to eliminate the influence of the light emitting element.

The control circuit 40 determines whether or not the error count is within the reference range (step S213). As long as the determination based on the error information is performed, the detailed determination method in step S213 may be any determination method.

The processing to be performed branches depending on the determination result in step S213. In a case where the control circuit 40 determines that the error count is within the reference range (YES in step S213), the adjustment processing is completed (step S215). After step S215, the distance measuring device may start the distance measuring processing by irradiating the object OBJ with light from the light emitting element.

In a case where the control circuit 40 determines that the error count is outside the reference range (NO in step S213), the control circuit 40 controls the power supply circuit and changes the power supply voltage of the SPAD array 240 (step S214). Examples of the case where the determination in step S213 is negative include a case where the number of error determinations is larger than a threshold or a case where the number of error determinations of a specific error code is larger than a threshold. Instead of the control circuit 40, the SPAD controller 221 or the external processing circuit 300 may change the setting of the power supply circuit. Furthermore, in a case where a plurality of power supply circuits is connected to the SPAD array 240, the setting of at least one of the power supply circuits may be changed in step S214.

For example, in a case where it is determined that the magnitude of the recharge current is insufficient, the control circuit 40 can control the power supply circuit to change the power supply potential Vdd used in the SPAD array 240 to be higher. As a result, the recharge current in each light receiving circuit can be increased. Furthermore, in a case where the phenomenon illustrated in the graph 62 of FIG. 4 is detected in the light receiving circuit in the SPAD array 240 and it is determined that the recharge current is excessive, the control circuit 40 can control the power supply circuit to change the power supply potential Vdd used in the SPAD array 240 to a lower level. As a result, the recharge current in the light receiving circuit in the SPAD array 240 can be reduced.

When the processing in step S204 is completed, the processing in steps S202 and S203 is performed again. That is, the errors in the plurality of light receiving circuits are counted again, and it is determined whether or not the error count is within the reference range. When the error count is within the reference range (YES in step S203), the adjustment processing is completed (step S205). After step S205, the distance measuring device may start the distance measuring processing by irradiating the object OBJ with light from the light emitting element.

The execution timing of the above-described processing of FIG. 15 is not limited to the time of calibration of the device. Accordingly, the processing of FIG. 15 may be performed at timing other than the time of calibration of the device. For example, after the operation of the device is started, the value of the power supply potential Vdd supplied by the power supply circuit may be adjusted.

A table T3 in FIG. 16 indicates the number of error determinations when the power supply potentials Vdd of a plurality of values are used in the SPAD array 240. For example, the measurement circuit 30 or the control circuit 40 measures the number of error determinations using different power supply potentials Vdd and generates the table T3. Referring to FIG. 16, the number of error determinations decreases when a higher power supply potential Vdd is set. For example, the control circuit 40 may adjust the power supply potential Vdd on the basis of a threshold $th_e$ of the number of error determinations. In this case, the control circuit 40 compares the number of error determinations $e_{d1}$ when a power supply potential $Vdd_1$ is used with the threshold $th_e$. In a case where $e_{d1} > th_e$, the control circuit 40 changes the power supply potential to $Vdd_2$ ($Vdd_1 \neq Vdd_2$). The control circuit 40 can determine whether to use $Vdd_2$ larger than $Vdd_1$ or $Vdd_2$ smaller than $Vdd_1$ on the basis of the information on the error code. Then, when the control circuit 40 determines that the number of error determinations is smaller than the threshold, distance measurement can be performed using the power supply potential at that time.

For example, in a case where data of the table T3 is obtained in the adjustment processing, the number of error determinations 3 can be used as the threshold $th_e$. However, the threshold may be different from this. Note that the values of the power supply potential included in the table of FIG. 16 are merely examples, and are not intended to limit the value of the power supply potential used in the light receiving circuit.

Note that, in a case where the number of error determinations is measured using a plurality of power supply potentials, the measurement of the number of error determinations may be started from the highest power supply potential $Vdd_{max}$ available in the light receiving circuit, or the measurement of the number of error determinations may be started from the lowest power supply potential $Vdd_{min}$ available in the light receiving circuit. Furthermore, the measurement of the number of error determinations may be started from a power supply potential of a value between $Vdd_{max}$ and $Vdd_{min}$. That is, the power supply potential at the start of the adjustment processing is not limited.

The control circuit 40 may continue the adjustment processing after the number of error determinations becomes smaller than the threshold $th_e$. For example, in a case where it is desired to use a recharge current as large as possible to shorten the dead time, the number of error determinations can be counted using a higher power supply potential, and the number of error determinations can be compared with the threshold $th_e$. In a case where the number of error determinations is smaller than the threshold the even after the change of the power supply potential, distance measurement can be performed using a further higher power supply potential. Furthermore, in a case where it is desired to use a power supply potential as low as possible to suppress the power consumption, the number of error determinations can be counted using a lower power supply potential, and the number of error determinations can be compared with the threshold $th_e$. In a case where the number of error determinations is smaller than the threshold $th_e$ even after the change of the power supply potential, distance measurement can be performed using a further lower power supply potential.

A light receiving device according to the present disclosure may include: a light receiving circuit including a light receiving element; a power supply circuit configured to supply a power supply potential to the light receiving circuit; and a control circuit configured to control the power supply potential supplied by the power supply circuit on the basis of a signal output from the light receiving circuit in a reaction with a photon.

As described above, the light receiving device according to the present disclosure may further include a load circuit that is connected to the light receiving circuit and supplies a recharge current to the light receiving element. In this case, the control circuit may be configured to change the parameter including at least one of the recharge current of the load circuit and the resistance value of the load circuit on the basis of the signal output from the light receiving circuit by the reaction with a photon.

Furthermore, the light receiving device according to the present disclosure may include a plurality of light receiving circuits. In this case, the control circuit may be configured to change at least one of the power supply potential of the power supply circuit or the parameter of the load circuit connected to at least one of the light receiving circuit on the basis of the signal output from the plurality of light receiving circuit.

Furthermore, the light receiving device according to the present disclosure may further include an error detector configured to determine an error on the basis of a waveform of a signal output from the light receiving circuit. As the error detector, the error detector 21 or the measurement circuit 30 described above can be used. In this case, the control circuit may be configured to change at least one of the power supply potential of the power supply circuit or the parameter of the load circuit connected to at least one of the light receiving circuit on the basis of the number of error determinations for the signal output from the plurality of light receiving circuit.

Furthermore, in the light receiving device of the present disclosure, at least one of the light receiving circuits may be configured to perform the passive recharge. In this case, the control circuit is configured to adjust the recharge current of the light receiving circuit so that the number of error determinations is less than a first threshold.

Moreover, in the light receiving device of the present disclosure, at least one of the light receiving circuits may be configured to perform the active recharge. In this case, the control circuit is configured to adjust a time delay at which a pulse is generated for active recharge in the light receiving circuit on the basis of the number of error determinations.

The error detector may be configured to perform error determination for at least one of the signal whose pulse width exceeds a second threshold or the signal whose interval between pulses is less than a third threshold. Furthermore, in the light receiving device according to the present disclosure, an avalanche photodiode may be used as the light receiving element.

Next, an example of a light receiving device having a function of correcting an output signal from a light receiving circuit in a case where the output signal is determined to be error will be described.

Figure 17:
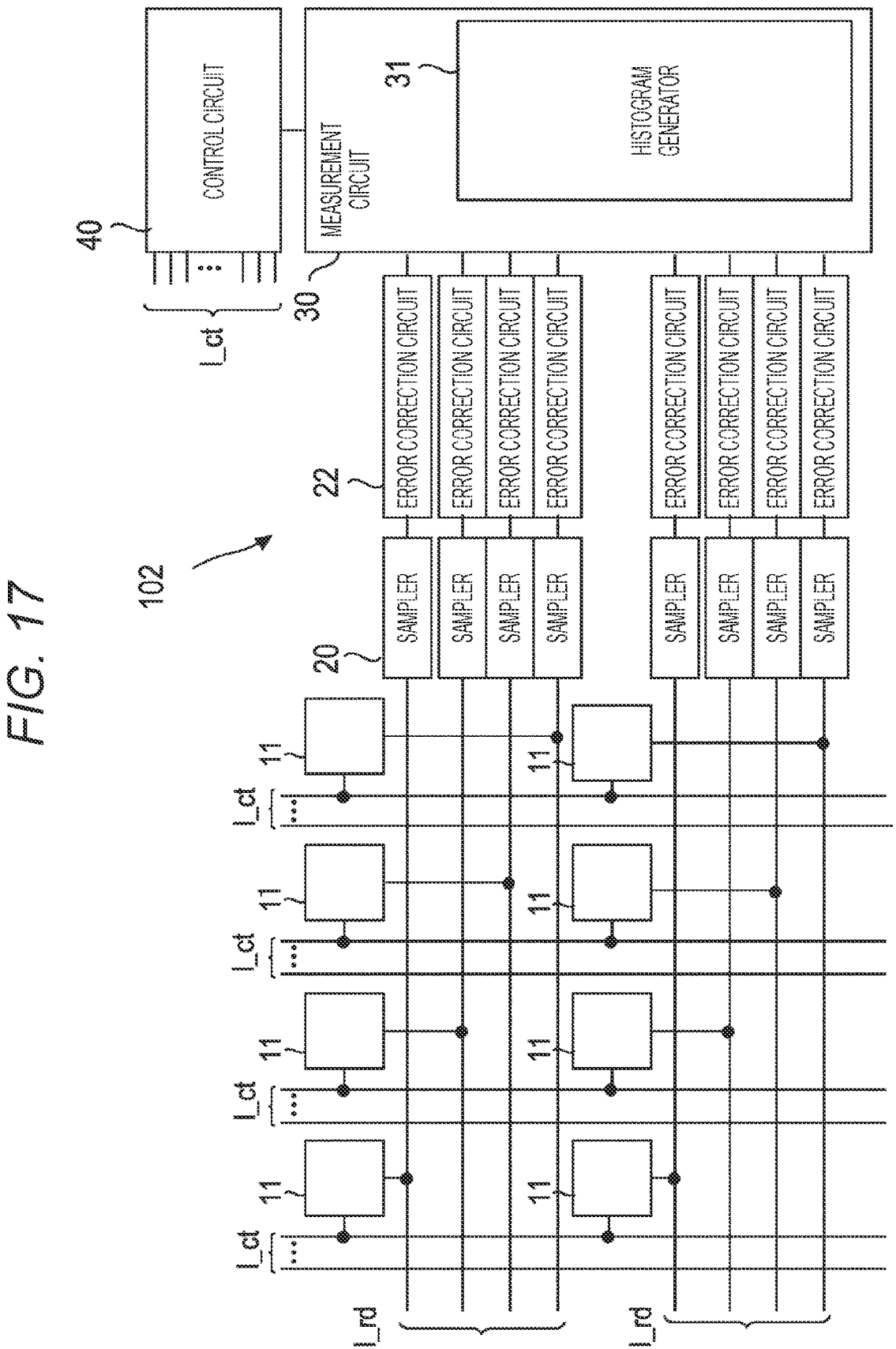
FIG. 17 is a block diagram illustrating an example of a distance measuring device according to Modification 2.

The block diagram of FIG. 17 illustrates an example of a distance measuring device according to Modification 2. In the light receiving device 102 of FIG. 17, an error correction circuit 22 is connected between the sampler 20 and each input terminal of the measurement circuit 30. The error correction circuit 22 is configured to correct a voltage signal determined to be in an error state among the voltage signals output from the sampler 20. The error correction circuit 22 corresponds to an error detector 21 to which a function of converting an error-determined voltage signal into a voltage signal that is not in an error state is added. The error correction circuit 22 is arranged in the circuit block 241 together with the sampler 20, for example. The configuration and function of the light receiving device 102 are similar to those of the light receiving device 101 described above except that the error detector 21 is replaced with the error correction circuit 22.

Note that the configuration of the light receiving device illustrated in FIG. 17 is merely an example. For example, the error correction circuit 22 may be connected between the light receiving circuit 11 and the sampler 20. Furthermore, a circuit in which the function of the sampler 20 and the function of the error correction circuit 22 are integrated may be connected between each light receiving circuit 11 and the input terminal of the measurement circuit 30. Furthermore, the plurality of signal lines 1_rd may be connected to a common error correction circuit without preparing the error correction circuit 22 for each of the signal lines 1_rd. In this case, it is necessary for one error correction circuit to perform the error determination of the plurality of signal lines 1_rd and correction of the signal, but the necessary circuit area can be reduced. Note that the function of converting the error-determined voltage signal into a voltage signal that is not in an error state may be implemented in the input stage of the measurement circuit 30. In this case, the measurement circuit 30 can correct the voltage signal output from the light receiving circuit 11 on the basis of the error signal received from the error detector 21. That is, it is also possible to adopt a configuration in which the measurement circuit 30 includes the error correction circuit 22.

Note that the configuration of the light receiving circuit 11 is not limited. For example, the light receiving circuit illustrated in FIGS. 3 and 5 can be used as the light receiving circuit 11. The light receiving circuit 11 may be a recharge circuit or an active recharge circuit. Furthermore, circuits having different configurations may be mixed in the plurality of light receiving circuits 11.

Figure 18:
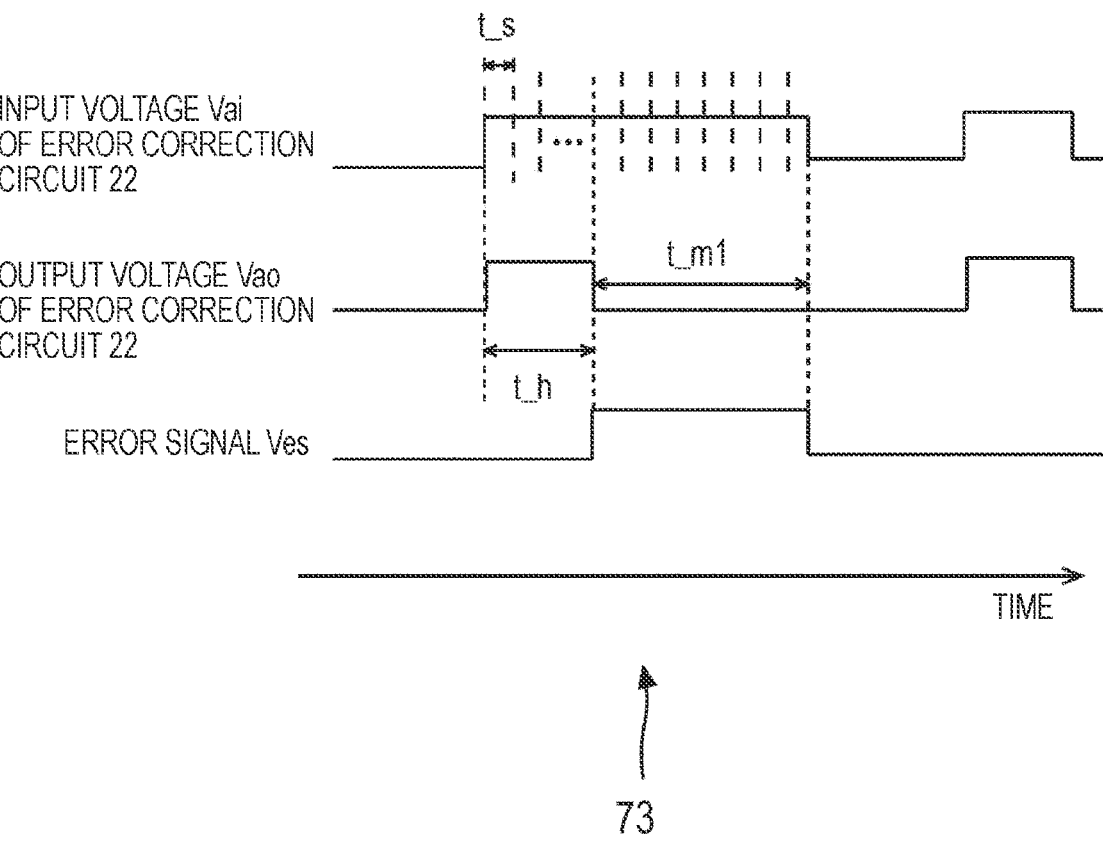
FIG. 18 is a graph illustrating an example of correction processing of a voltage waveform in the distance measuring device of FIG. 17.
Figure 19:
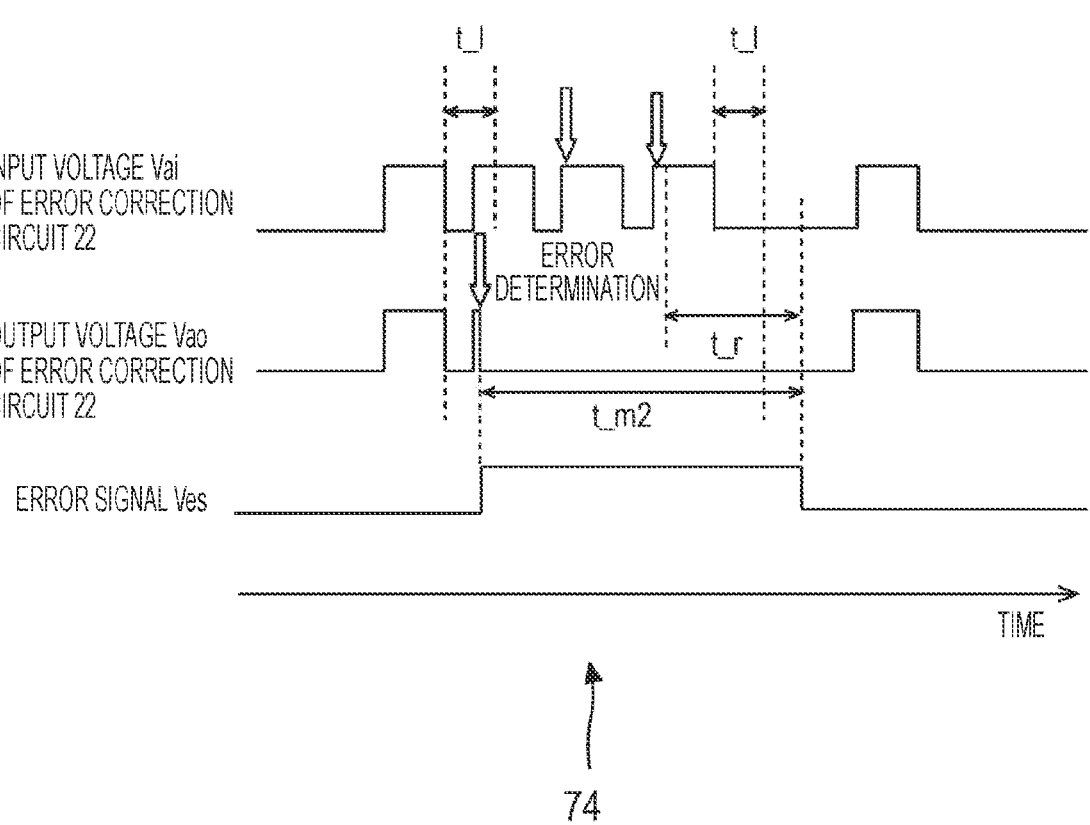
FIG. 19 is a graph illustrating an example of correction processing of a voltage waveform in the distance measuring device of FIG. 17.

The graphs of FIGS. 18 and 19 illustrate an example of correction processing of a voltage waveform in the light receiving device 102 of FIG. 17. In each graph, the horizontal axis represents time.

A graph 73 of FIG. 18 illustrates waveforms of an input voltage Vai of the error correction circuit 22, an output voltage Vao of the error correction circuit 22, and an error signal Ves. In the graph 73, the light receiving circuit 11 performs passive recharge, but the time required for recharging is too long. Therefore, in the graph 73, the pulse width output from the light receiving circuit 11 is too large. For example, the error correction circuit 22 detects a rising of a pulse in the voltage signal output from the light receiving circuit 11. Then, the error correction circuit 22 monitors the pulse width. The error correction circuit 22 outputs the input signal as it is until error determination is performed. The error correction circuit 22 makes an error determination in a case where the pulse width exceeds the threshold t_h. When error determination is made during detection of a pulse, the error correction circuit 22 masks a portion exceeding the threshold t_h in the pulse.

In the example of the graph 73, the error correction circuit 22 outputs a HIGH voltage in a period t_h from the rising of the pulse. Then, the error correction circuit 22 outputs the LOW voltage in a portion of the period t_m1 corresponding to after the pulse width exceeds t_h. As described above, even in a case where the light receiving circuit 11 outputs a pulse having a pulse width exceeding the threshold t_h, the error correction circuit 22 can correct the pulse to a pulse having a pulse width equal to the threshold t_h. Note that, in the example of the graph 73, the voltage of the error signal Ves is HIGH in the period t_m1 in which the pulse is masked. As a result, it is possible to notify the measurement circuit 30 at the subsequent stage that the error determination has been performed. Note that the error correction circuit 22 may notify the measurement circuit 30 of an error code.

The error correction circuit 22 samples the input voltage Vai in the cycle t_s, and can perform error determination in a case where the sampled voltage is successively at the HIGH level n_h times. Here, the values of t_s and n_h can be set such that the relationship of t_h=t_s×n_h is satisfied. For example, t_s=1 nanosecond, n_h=10, and t_h=10 nanoseconds can be set. However, error determination may be performed by a method different from this method.

A graph 74 of FIG. 19 illustrates waveforms of an input voltage Vai of the error correction circuit 22, an output voltage Vao of the error correction circuit 22, and an error signal Ves. In the example of the graph 74, the light receiving circuit 11 performs active recharge. In the example of the graph 74, the output voltage (that is, the input voltage Vai of the error correction circuit 22) of the light receiving circuit 11 is hunting by the phenomenon illustrated in graph 64 or graph 67. The error correction circuit 22 outputs the input signal as it is until error determination is performed. For example, the error correction circuit 22 performs the error determination in a case where the input voltage Vai is in the period LOW shorter than the threshold t_l after the pulse of the input voltage Vai falls. When error determination is performed, the error correction circuit 22 may output a HIGH error signal Ves. Furthermore, note that the error correction circuit 22 may notify the measurement circuit 30 of an error code. The error correction circuit 22 masks the pulse for a predetermined period t_m2 after the error determination.

In the example of the graph 74, the error correction circuit 22 outputs the LOW level voltage in the period t_m2 after the error determination. This period t_m2 is referred to as a masking period. When masking period t_m2 elapses after the error determination, the error correction circuit 22 again outputs the input signal as it is. For example, in the graph 74, after the masking period t_m2 has elapsed, the error correction circuit 22 outputs a pulse again. For example, a value larger than the threshold t_l can be set as the masking period t_m2.

Furthermore, the error correction circuit 22 may adjust the masking period t_m2 according to the error determination situation at the input voltage Vai. For example, at the input voltage Vai in the graph 74, three pulses arrive at intervals shorter than the threshold t_l after the arrival of the first pulse. Therefore, the error correction circuit 22 continuously performs error determination three times at the timing indicated by the white arrow. However, the error correction circuit 22 can release the error state in a case where the error determination is not performed during the period t_r after the last error determination. When the error state is released, the error correction circuit 22 outputs the reinput pulse as it is. As in the example of the graph 74, the error correction circuit 22 may set the error signal Ves to LOW when releasing the error state. Note that, instead of continuously outputting the HIGH error signal Ves during the period t_m2, the error correction circuit 22 may output a discontinuous HIGH error signal Ves each time error determination is made.

For example, the error correction circuit 22 samples the voltage of the signal in the cycle t_s, and can perform the error determination in a case where the number of times the sampled voltage successively becomes LOW is less than n_l times. The values of t_s and n_l can be set such that the relationship of t_l=t_s×n_l is satisfied. However, the error correction circuit 22 may perform the error determination by a method different from this method.

Here, the error determination and the error correction in a case where the light receiving circuit 11 outputs a pulse at a HIGH level (positive polarity) at the time of photon detection has been described. However, the error correction circuit 22 can perform error determination also in a case where the light receiving circuit 11 outputs a pulse at a LOW level (negative polarity). In that case, it is sufficient that the error correction circuit 22 performs an operation in which HIGH is replaced with LOW, LOW is replaced with HIGH, falling of the pulse is replaced with rising of the pulse, and rising of the pulse is replaced with falling of the pulse in the above-described description.

Even in a case where the light receiving device 102 including the error correction circuit 22 is used, it is possible to perform adjustment processing of the light receiving circuit, the pulse generator, or the power supply circuit using the above-described flowchart or table.

As described above, the light receiving device according to the present disclosure may further include an error correction circuit configured to perform error determination on the basis of a waveform of the signal output from the light receiving circuit and correct a waveform of the signal for which the error determination has been performed. As the error correction circuit, for example, the error correction circuit 22 or the measurement circuit 30 described above can be used. In this case, the error correction circuit may be configured to perform error determination for at least one of the signal whose pulse width exceeds a second threshold or the signal whose interval between pulses is less than a third threshold. In a case where the light receiving device includes the error correction circuit, the control circuit may be configured to change at least one of the power supply potential of the power supply circuit or the parameter of the load circuit connected to at least one of the light receiving circuit on the basis of the number of error determinations for the signal output from the plurality of light receiving circuit.

Figure 20:
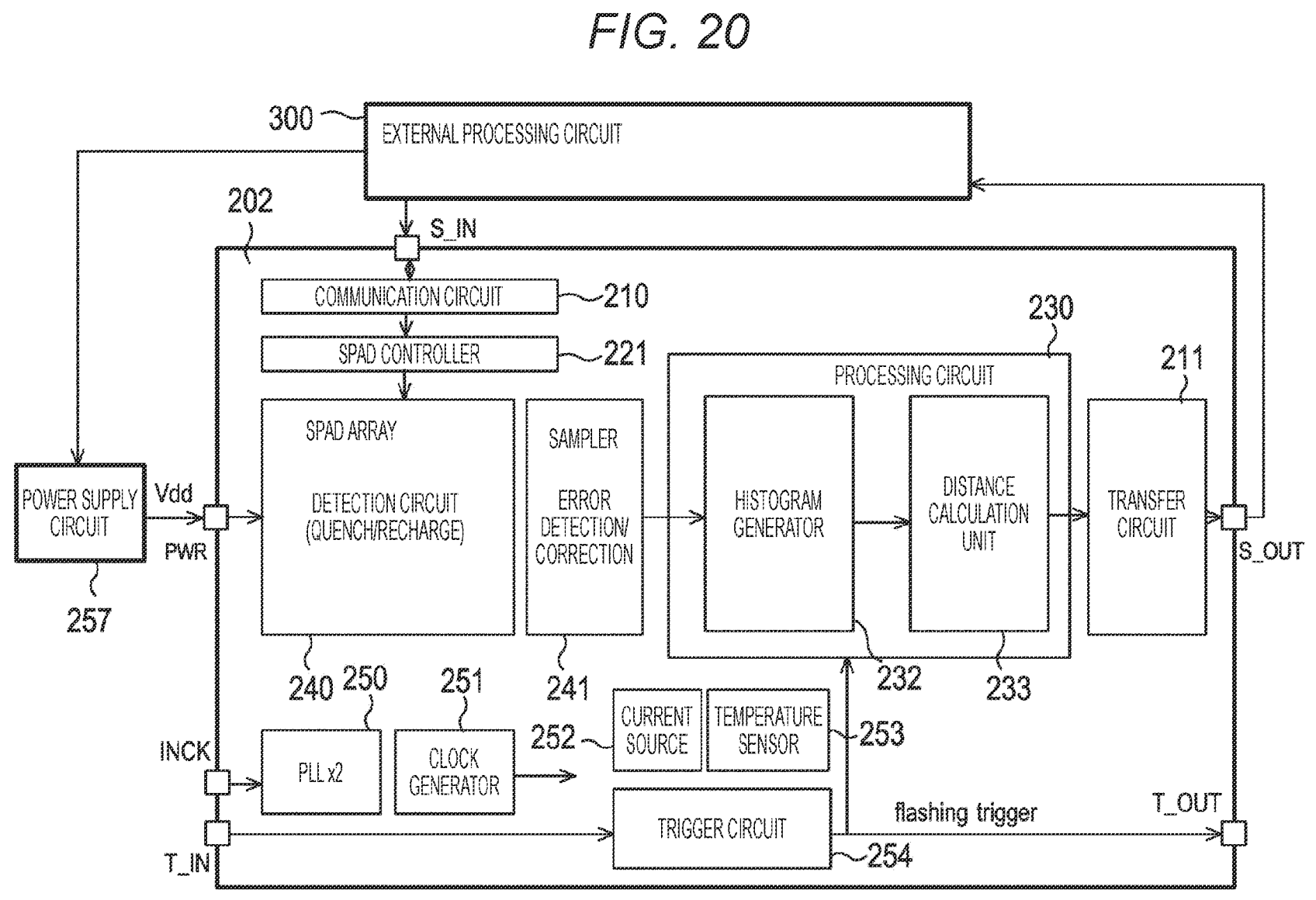

The block diagram of FIG. 20 illustrates an example of a distance measuring device according to Modification 3. FIG. 20 illustrates a light receiving device 202 and an external processing circuit 300. The light receiving device 202 corresponds to a configuration in which the control circuit 220 and the power supply circuit 256 are omitted from the components of the light receiving device 200 (FIG. 1). The processing circuit 230 of the light receiving device 202 is connected to the external processing circuit 300 via a transfer circuit 211 and a terminal S_OUT. Furthermore, the SPAD controller 221 of the light receiving device 202 is connected to the external processing circuit 300 via a terminal S_IN and a communication circuit 210. As illustrated in FIG. 20, an external power supply circuit 257 may be used as a circuit that supplies a power supply potential Vdd to a SPAD array 240. The power supply circuit 257 is connected to the SPAD array 240 in a distance measuring device 204 via a terminal PWR. Furthermore, the power supply circuit 257 is connected to the external processing circuit 300 via a control signal line. The external processing circuit 300 changes the value of the power supply potential Vdd by transmitting a control signal to the power supply circuit 257.

The external processing circuit 300 is, for example, a hardware circuit such as an ASIC or an FPGA. However, the external processing circuit 300 may be a computer including a central processing unit (CPU) and a storage. In this case, the external processing circuit 300 provides various functions by executing a program stored in the storage on the CPU.

The external processing circuit 300 performs a function corresponding to the control circuit 220 of FIG. 1 (the control circuit 40 of FIGS. 8 and 17). That is, the external processing circuit 300 separate from the light receiving device 202 may perform setting of each light receiving circuit 11 and setting of the power supply circuit. Note that communication between the external processing circuit 300 and the light receiving device 202 may be performed by wire or wirelessly.

Figure 21:
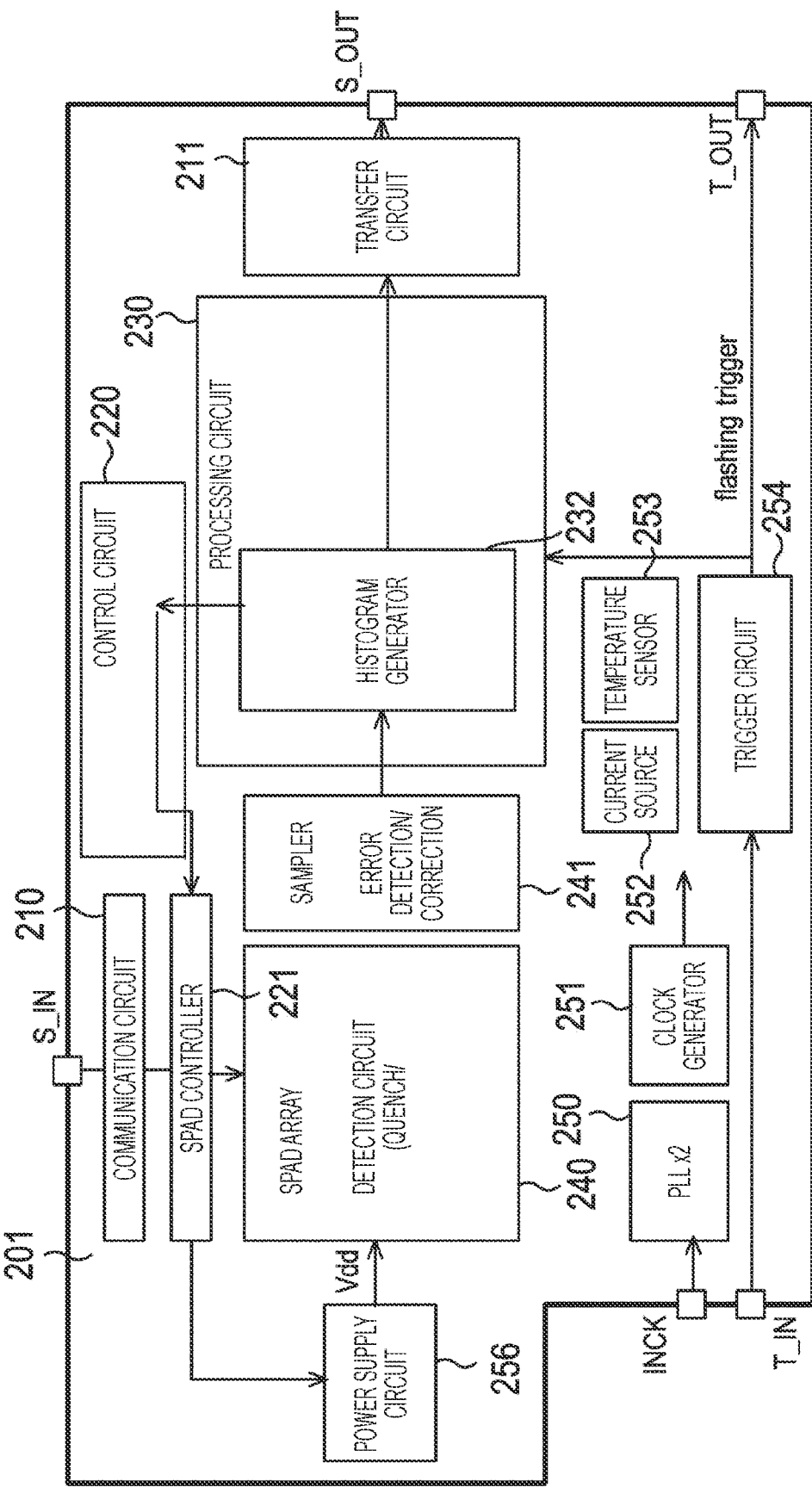
FIG. 21 is a block diagram illustrating an example of a light receiving device according to Modification 4.

The block diagram of FIG. 21 illustrates an example of a light receiving device according to Modification 4. The light receiving device according to the present disclosure may be a distance measuring device including a light emitting element and a distance calculation unit as in the devices illustrated in FIGS. 1 and 20. However, the light receiving device according to the present disclosure may not necessarily include the distance measuring function. For example, as in the light receiving device 201 in FIG. 21, a device in which the distance calculation unit 233 and the trigger circuit 254 are omitted may be used. The light receiving device 201 can detect a photon by a SPAD array 240 and generate a histogram. The light receiving device 201 may be connected to another device, and functions corresponding to a distance calculation unit, a trigger circuit, and a light emitting element may be added. Furthermore, the light receiving device 201 can be used as a device that determines the setting of the SPAD array 240 and the power supply potential. In this case, another distance measuring device can perform distance measurement on the basis of the setting of the SPAD array 240 determined by the light receiving device 201 and the power supply potential.

Hereinafter, an example of another light receiving circuit that can be used as a pixel in the SPAD array 240 will be described.

Figure 22:
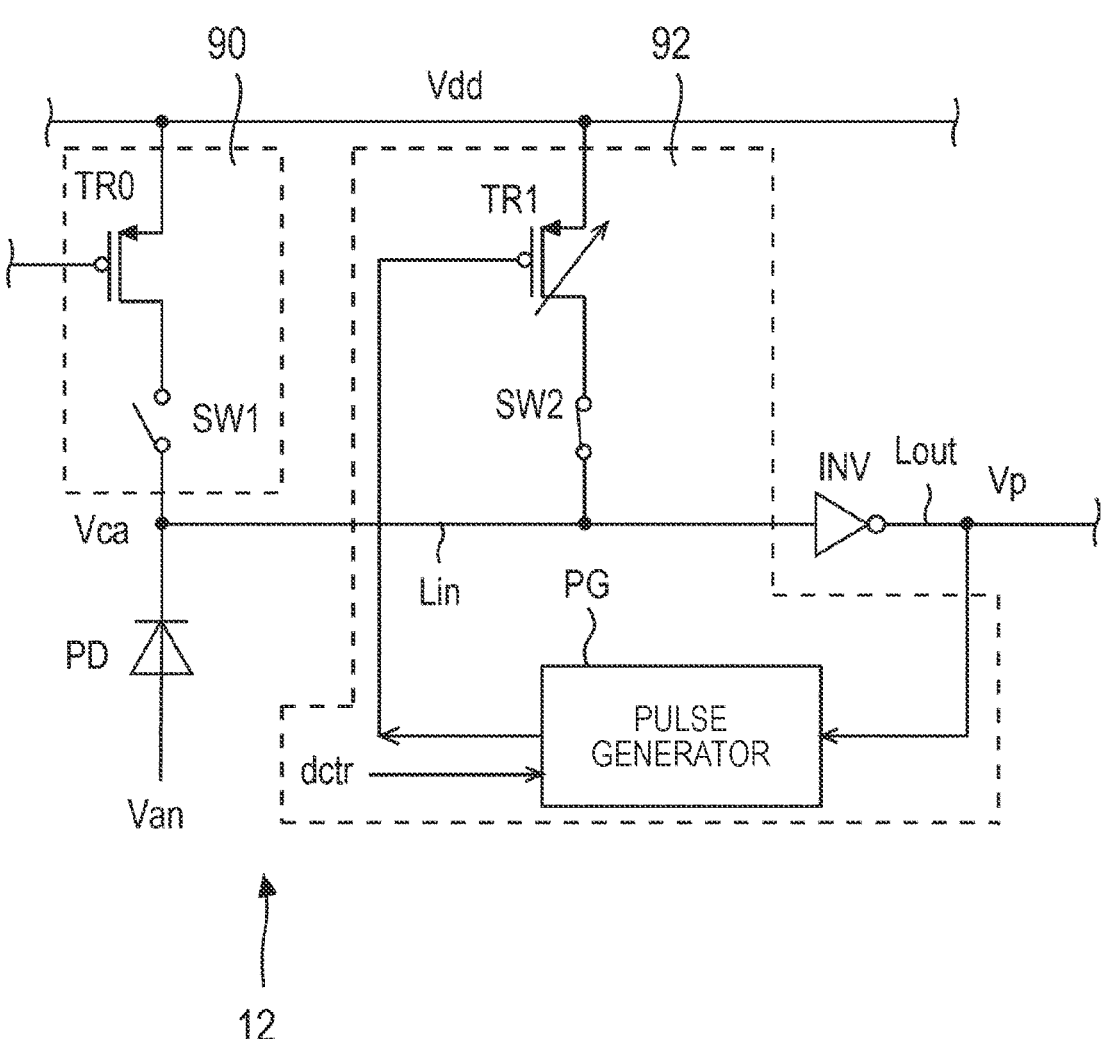
FIG. 22 is a circuit diagram illustrating an example of a circuit according to Modification 5.

The circuit diagram of FIG. 22 illustrates an example of a circuit according to Modification 5. A light receiving circuit 12 in FIG. 22 corresponds to a circuit in which the transistor TR2 and the switch SW3 of the light receiving circuit 10 are omitted. That is, in the light receiving circuit 12, a portion of the light receiving circuit 10 that latches the state of the transistor TR1 is omitted. In the light receiving circuit 12, passive recharge is performed when SW1 is set to ON and SW2 is set to OFF. Furthermore, in the light receiving circuit 12, active recharge is performed when SW1 is set to OFF and SW2 is set to ON. Note that, in the light receiving circuit 12, when both SW1 and SW2 are set to ON, both passive recharge and active recharge are performed. Note that the operation of the light receiving circuit 12 is similar to that of the light receiving circuit 10 described above except that the operation of latching the state of the transistor TR1 is eliminated.

Figure 23:
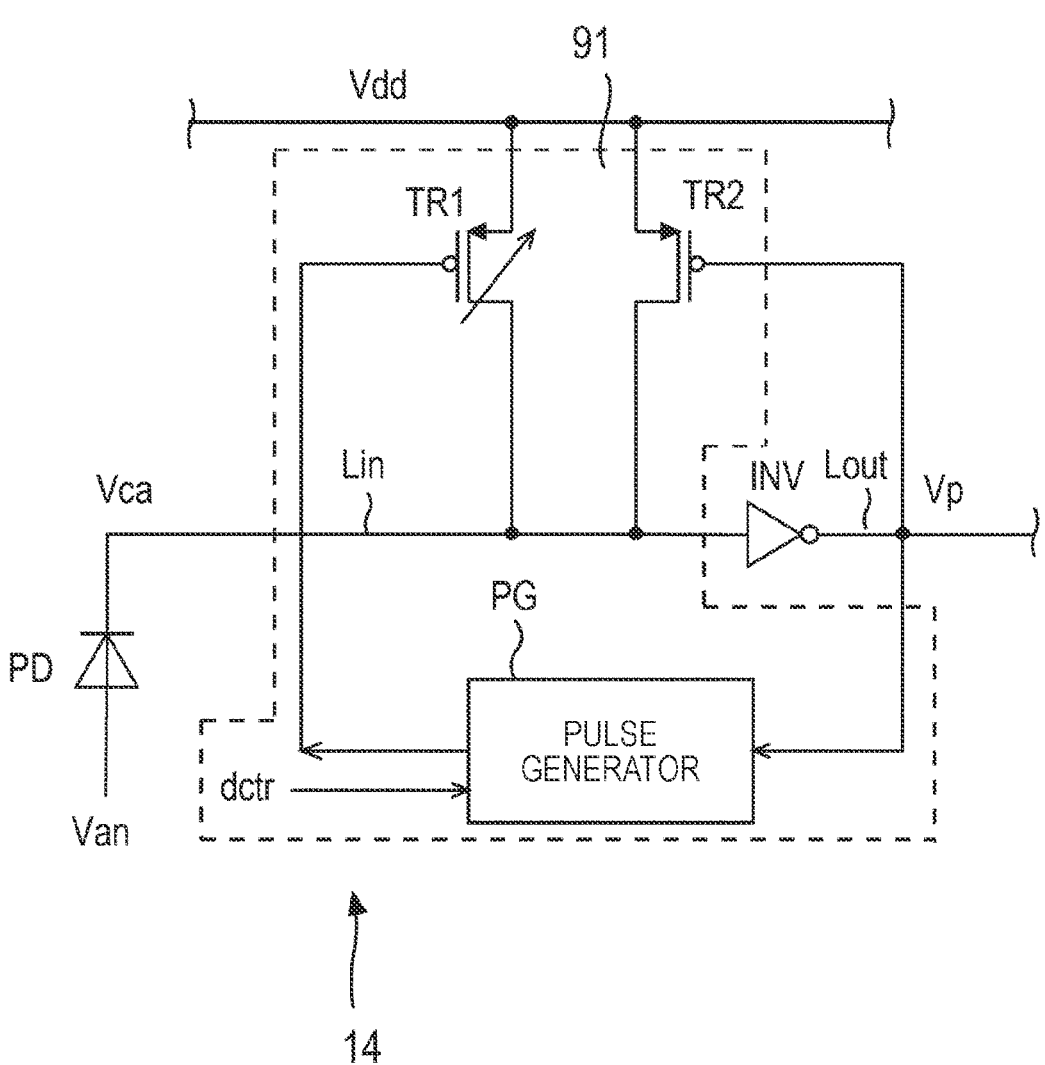
FIG. 23 is a circuit diagram illustrating an example of a circuit according to Modification 6.

The circuit diagram of FIG. 23 illustrates an example of a circuit according to Modification 6. A light receiving circuit 14 in FIG. 23 corresponds to a circuit in which load element 90 (transistor TR0) of the light receiving circuit 10 is omitted. That is, the light receiving circuit 14 is a circuit dedicated to active recharge. The operation of the light receiving circuit 14 is similar to the case where the switch SW1 is set to OFF, the switch SW2 is set to ON, and the switch SW3 is set to ON in the light receiving circuit 10 (switch setting st1 of the table 70).

A distance measuring device according to the present disclosure may include: a light emitting element; a plurality of light receiving circuits; a power supply circuit configured to supply a power supply potential to the plurality of light receiving circuits; and a control circuit configured to control the power supply potential on the basis of a signal output from the plurality of light receiving circuits in a reaction with a photon during a period in which the light emitting element does not emit light. Furthermore, the distance measuring device according to the present disclosure may further include a plurality of load circuits each of which is connected to each of the light receiving circuits and that supplies a recharge current to the light receiving element in the light receiving circuit. In this case, the control circuit may be configured to control at least one of the resistance value or the recharge current of the plurality of load circuits on the basis of the signal.

Furthermore, the control circuit of the distance measuring device according to the present disclosure may be configured to adjust a time delay in which a pulse for active recharge is generated in at least one of the light receiving circuits on the basis of the signal.

When the light receiving device, the distance measuring device, and the light receiving circuit according to the present disclosure are used, the distance measurement can be started after setting for minimizing the dead time is performed. Therefore, photon detection or distance measurement can be performed with high accuracy. In the light receiving device, the distance measuring device, and the light receiving circuit according to the present disclosure, at least one of a plurality of methods may be selected to adjust the recharge current. For example, the power supply circuit may adjust the power supply potential to be supplied to the plurality of light receiving circuits according to the number of error determinations in the plurality of light receiving circuits. In a case where a common power supply potential is supplied in the SPAD array, the setting of the recharge current of overall the SPAD array can be changed in a short time.

Furthermore, the SPAD array may include a pixel in which a load circuit whose resistance value is adjustable or a load circuit whose current value is adjustable is connected to the light receiving circuit. As a result, the value of the recharge current can be adjusted with higher accuracy in units of individual pixels. For example, it is easy to adjust the recharge current for each region in the SPAD array. This makes it possible to obtain a high-quality distance image. In a case where the light receiving device, the light receiving circuit, and the distance measuring device according to the present disclosure are used, it is possible to improve distance measuring performance while suppressing power consumption.

The technology (the present technology) according to the present disclosure can be applied to various products. For example, the technology according to the present disclosure may be realized as a device mounted on any type of mobile body such as a car, electric vehicle, hybrid electric vehicle, motorcycle, bicycle, personal mobility, airplane, drone, ship, or robot.

FIG. 24 is a block diagram showing a schematic configuration example of a vehicle control system which is an example of a mobile body control system to which the technology according to the present disclosure can be applied.

The vehicle control system 12000 includes a plurality of electronic control units connected via a communication network 12001. In the example shown in FIG. 24, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, a sound image output unit 12052, and an in-vehicle network interface (I/F) 12053 are illustrated.

The drive system control unit 12010 controls the operation of devices related to the drive system of the vehicle according to various programs. For example, the drive system control unit 12010 functions as a control device for a driving force generating device for generating a driving force of a vehicle such as an internal combustion engine or a driving motor, a driving force transmitting mechanism for transmitting a driving force to the wheels, a steering mechanism that adjusts steering of a vehicle, a braking device that generates a braking force of a vehicle, or the like.

The body system control unit 12020 controls the operation of various devices equipped in a vehicle body according to various programs. For example, the body system control unit 12020 functions as a control device for a keyless entry system, a smart key system, a power window device, or various lamps such as a head lamp, a back lamp, a brake lamp, a turn indicator, or a fog lamp. In this case, a radio wave transmitted from a portable device that substitutes for a key or a signal of various switches may be input to the body system control unit 12020. The body system control unit 12020 receives the input of these radio waves or signals and controls a door lock device, a power window device, a lamp, or the like of the vehicle.

The vehicle exterior information detection unit 12030 detects information outside the vehicle on which the vehicle control system 12000 is mounted. For example, an imaging unit 12031 is connected to the vehicle exterior information detection unit 12030. The vehicle exterior information detection unit 12030 causes the imaging unit 12031 to capture an image of the exterior of the vehicle and receives the captured image. The vehicle exterior information detection unit 12030 may perform object detection processing or distance detection processing such as a person, a car, an obstacle, a sign, or a character on a road surface, on the basis of the received image.

The imaging unit 12031 is an optical sensor that receives light and outputs an electric signal corresponding to the amount of light received. The imaging unit 12031 can output an electric signal as an image or output the electric signal as distance measurement information. Furthermore, the light received by the imaging unit 12031 may be visible light or invisible light such as infrared light.

The vehicle interior information detection unit 12040 detects information inside the vehicle. For example, a driver state detection unit 12041 that detects the state of the driver is connected to the vehicle interior information detection unit 12040. The driver state detection unit 12041 includes, for example, a camera that images the driver, and the vehicle interior information detection unit 12040 may calculate the degree of fatigue or degree of concentration of the driver on the basis of the detection information input from the driver state detection unit 12041, or may determine whether or not the driver is dozing off.

The microcomputer 12051 can calculate a control target value of the driving force generating device, the steering mechanism, or the braking device on the basis of the information inside and outside of the vehicle acquired by the vehicle exterior information detection unit 12030 or the vehicle interior information detection unit 12040, and can output a control command to the drive system control unit 12010. For example, the microcomputer 12051 can perform cooperative control for the purpose of realization of the function of advanced driver assistance system (ADAS) including collision avoidance or impact mitigation of the vehicle, follow-up running based on the inter-vehicle distance, vehicle speed maintenance running, vehicle collision warning, vehicle lane departure warning, or the like.

Furthermore, the microcomputer 12051 controls the driving force generating device, the steering mechanism, the braking device, or the like on the basis of the information regarding the surroundings of the vehicle acquired by the vehicle exterior information detection unit 12030 or the vehicle interior information detection unit 12040, so that the microcomputer 12051 can perform cooperative control for the purpose of, for example, automatic driving in which a vehicle autonomously runs without depending on the operation of the driver.

Furthermore, the microcomputer 12051 can output a control command to the body system control unit 12020 on the basis of the vehicle exterior information acquired by the vehicle exterior information detection unit 12030. For example, the microcomputer 12051 can control the head-lamp according to the position of the preceding vehicle or the oncoming vehicle detected by the vehicle exterior information detection unit 12030, and perform cooperative control for the purpose of antiglare such as switching the high beam to low beam.

The sound image output unit 12052 transmits at least one of sound or image output signals to an output device capable of visually or audibly notifying the occupant of the vehicle or the outside of the vehicle, of information. In the example of FIG. 24, as an output device, an audio speaker 12061, a display unit 12062, and an instrument panel 12063 are illustrated. The display unit 12062 may include at least one of an on-board display or a head-up display, for example.

Figure 25:
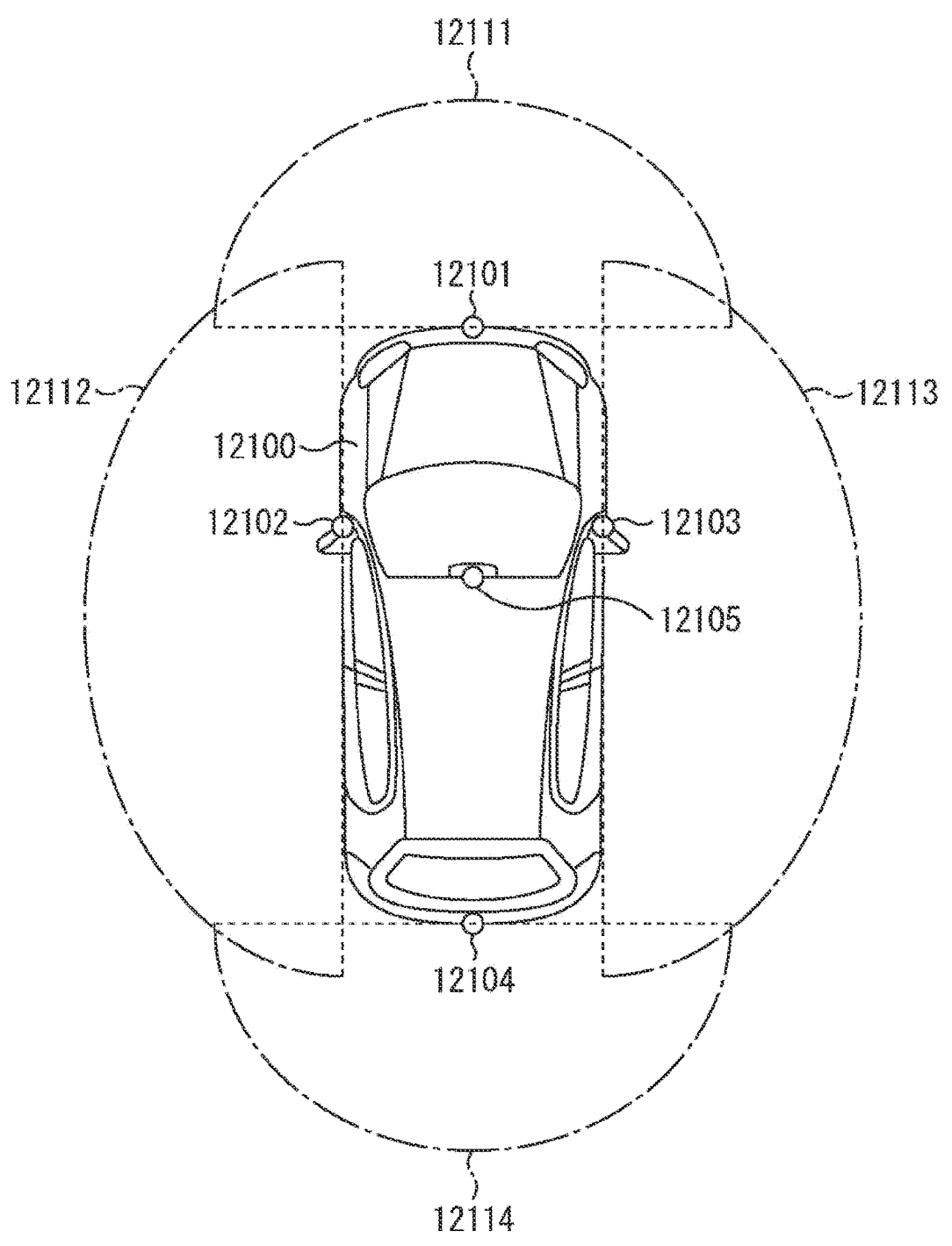
FIG. 25 is an explanatory diagram showing an example of installation positions of a vehicle exterior information detection part and an imaging unit.

FIG. 25 is a diagram showing an example of an installation position of an imaging unit 12031.

In FIG. 25, the vehicle 12100 includes as the imaging unit 12031, imaging units 12101, 12102, 12103, 12104, and 12105.

For example, the imaging units 12101, 12102, 12103, 12104, 12105 are provided at positions such as the front nose, the side mirror, the rear bumper, the back door, and the upper portion of the windshield in the vehicle compartment of the vehicle 12100. The imaging unit 12101 included in the front nose and the imaging unit 12105 included in the upper portion of the windshield in the vehicle compartment mainly acquire an image of the forward of the vehicle 12100. The imaging units 12102 and 12103 included in the side mirrors mainly acquire images of the sides of the vehicle 12100. The imaging unit 12104 included in the rear bumper or the back door mainly acquires images of the rearward of the vehicle 12100. The images of the forward acquired by the imaging units 12101 and 12105 are mainly used for detection of a preceding vehicle, a pedestrian, an obstacle, a traffic signal, a traffic sign, a lane, or the like.

Note that FIG. 25 shows an example of the imaging range of the imaging units 12101 to 12104. An imaging range 12111 indicates an imaging range of the imaging unit 12101 provided in the front nose, the imaging ranges 12112 and 12113 indicate the imaging range of the imaging units 12102 and 12103 provided in the side mirror, respectively, and the imaging range 12114 indicates the imaging range of the imaging unit 12104 provided in the rear bumper or the back door. For example, by overlapping the image data imaged by the imaging units 12101 to 12104, an overhead view image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be an imaging element having a pixel for phase difference detection.

For example, the microcomputer 12051 obtains the distance to each three-dimensional object within the imaging range 12111 to 12114 and the temporal change of the distance (relative speed with respect to the vehicle 12100), on the basis of the distance information obtained from the imaging units 12101 to 12104, so that the microcomputer 12051 can extract a three-dimensional object that is the closest on the traveling path of the vehicle 12100 and runs at a predetermined speed (for example, 0 km/h or more) in substantially the same direction as that of the vehicle 12100, as a preceding vehicle. Moreover, the microcomputer 12051 can set an inter-vehicle distance to be secured in front of the preceding vehicle, and can perform automatic brake control (including follow-up stop control), automatic acceleration control (including follow-up start control), or the like. In this manner, it is possible to perform cooperative control for the purpose of automatic driving or the like that autonomously runs without depending on the operation of the driver.

For example, on the basis of the distance information obtained from the imaging units 12101 to 12104, the microcomputer 12051 can classify three-dimensional object data on the three-dimensional object into other three-dimensional objects such as a two-wheeled vehicle, a regular vehicle, a large vehicle, a pedestrian, a telephone pole, and the like, and extract the result to use the result for automatic avoidance of obstacles. For example, the microcomputer 12051 identifies an obstacle in the vicinity of the vehicle 12100 as an obstacle that the driver of the vehicle 12100 can see and an obstacle that is difficult to see. Then, the microcomputer

12051 determines the collision risk indicating the risk of collision with each obstacle, and when the collision risk is equal to or higher than an operation parameter and there is a possibility of collision, the microcomputer 12051 can output an alarm to the driver via the audio speaker 12061 and the display unit 12062 or perform forced deceleration or avoiding steering via the drive system control unit 12010, so as to perform driving assistance for collision avoidance.

At least one of the imaging units 12101 to 12104 may be an infrared camera for detecting infrared rays. For example, the microcomputer 12051 can recognize a pedestrian by determining whether or not a pedestrian exists in the captured images of the imaging units 12101 to 12104. Such recognizing of a pedestrian is performed, for example, by a procedure of extracting feature points in the captured image of the imaging units 12101 to 12104 as an infrared camera and a procedure of performing pattern matching processing on a series of feature points indicating the outline of the object and discriminate whether or not it is a pedestrian. If the microcomputer 12051 determines that a pedestrian exists in the captured images of the imaging units 12101 to 12104 and recognizes the pedestrian, the sound image output unit 12052 causes the display unit 12062 to superimpose and display a rectangular contour line for emphasis on the recognized pedestrian. Furthermore, the sound image output unit 12052 may cause the display unit 12062 to display icons or the like indicating pedestrians at desired positions.

An example of the vehicle control system to which the technology according to the present disclosure can be applied has been described above. The technology according to the present disclosure can be applied to the imaging unit 12031. For example, the light receiving device 200 of FIG. 1 and the light emitting element 255 of FIG. 2 can be mounted on the imaging unit 12031. Furthermore, at least one of the light receiving devices 200 to 202 may be mounted on the imaging unit 12031. By applying the technology according to the present disclosure to the imaging unit 12031, distance measurement can be performed with higher accuracy. As a result, the safety of the vehicle 12100 can be enhanced.

Note that, the present technology can also adopt the following configuration.

(1)

A light receiving device including:

a light receiving circuit including a light receiving element;

a power supply circuit configured to supply a power supply potential to the light receiving circuit; and a control circuit configured to control the power supply potential supplied by the power supply circuit on the basis of a signal output from the light receiving circuit in a reaction with a photon.

(2)

The light receiving device according to (1), further including a load circuit that is connected to the light receiving circuit and supplies a recharge current to the light receiving element, in which the control circuit is configured to change a parameter including at least one of the recharge current of the load circuit or a resistance value of the load circuit on the basis of the signal.

(3)

The light receiving device according to (2), further including a plurality of the light receiving circuit, in which the control circuit is configured to change at least one of the power supply potential of the power supply circuit or the parameter of the load circuit connected to at least one of the light receiving circuit on the basis of the signal output from the plurality of the light receiving circuit.

(4)

The light receiving device according to (3), further including an error detector configured to perform error determination on the basis of a waveform of the signal output from the light receiving circuit, in which the control circuit is configured to change at least one of the power supply potential of the power supply circuit or the parameter of the load circuit connected to at least one of the light receiving circuit on the basis of the number of error determinations for the signal output from the plurality of the light receiving circuit.

(5)

The light receiving device according to (4), in which at least one of the light receiving circuit is configured to perform passive recharge, and the control circuit is configured to adjust the recharge current of the light receiving circuit so that the number of error determinations is less than a first threshold.

(6)

The light receiving device according to (4) or (5), in which at least one of the light receiving circuit is configured to perform active recharge, and the control circuit is configured to adjust a time delay in which a pulse is generated for the active recharge in the light receiving circuit on the basis of the number of error determinations.

(7)

The light receiving device according to any one of (4) to (6), in which the error detector is configured to perform error determination for at least one of the signal whose pulse width exceeds a second threshold or the signal whose interval between pulses is less than a third threshold.

(8)

The light receiving device according to any one of (3) to (7), further including an error correction circuit configured to perform error determination on the basis of a waveform of the signal output from the light receiving circuit and correct the waveform of the signal for which the error determination has been performed.

(9)

The light receiving device according to (8), in which the error correction circuit is configured to perform error determination for at least one of the signal whose pulse width exceeds a second threshold or the signal whose interval between pulses is less than a third threshold.

(10)

The light receiving device according to (8), in which the control circuit is configured to change at least one of the power supply potential of the power supply circuit or the parameter of the load circuit connected to at least one of the light receiving circuit on the basis of the number of error determinations for the signal output from the plurality of the light receiving circuit.

(11)

The light receiving device according to (10), in which at least one of the light receiving circuit is configured to perform passive recharge, and the control circuit is configured to adjust the recharge current of the light receiving circuit so that the number of error determinations is less than a first threshold.

(12)

The light receiving device according to (10) or (11), in which at least one of the light receiving circuit is configured to perform active recharge, and the control circuit is configured to adjust a time delay in which a pulse is generated for the active recharge in the light receiving circuit on the basis of the number of error determinations.

(13)

The light receiving device according to any one of (1) to (12), in which the light receiving element is an avalanche photodiode.

(14)

A distance measuring device including:

a light emitting element;

a plurality of light receiving circuits including the light receiving element;

a power supply circuit configured to supply a power supply potential to the plurality of light receiving circuits; and a control circuit configured to control the power supply potential on the basis of a signal output from the plurality of light receiving circuits in a reaction with a photon during a period in which the light emitting element does not emit light.

(15)

The distance measuring device according to (14), further including a plurality of load circuits that is connected to each of the light receiving circuits and supplies a recharge current to the light receiving element, in which the control circuit is configured to control at least one of a resistance value or the recharge current of the plurality of load circuits on the basis of the signal.

(16)

The distance measuring device according to (14) or (15), in which the control circuit is configured to adjust a time delay in which a pulse for active recharge is generated in at least one of the light receiving circuits on the basis of the signal.

(17)

A light receiving circuit including:

a light receiving element;

a current source;

a switch capable of turning on either a first contact side connected to a reference potential or a second contact side connected to the light receiving element;

a current mirror circuit configured to supply, from an output side, a second current obtained by mirroring a first current flowing between the reference potential and the current source; and a transistor having a first signal electrode connected to the reference potential, a second signal electrode connected to the light receiving element and the output side of the current mirror circuit, and a control electrode connected to the switch.

(18)

The light receiving circuit according to (17), further including a plurality of the switch and the transistor, the light receiving circuit being configured such that a third current obtained by multiplying the first current by N (N is a positive integer) is supplied to the light receiving element in response to switching of the switch.

(19)

The light receiving circuit according to (17) or (18), further including a readout circuit configured to generate a pulse when the light receiving element reacts with a photon.

(20)

A light receiving circuit including:

a light receiving element;

a plurality of resistors connected in parallel between a reference potential and the light receiving element;

a plurality of switches each connected in series with the resistor; and a readout circuit configured to generate a pulse when the light receiving element reacts with a photon, the light receiving circuit being configured such that a current supplied to the light receiving element is adjusted according to switching of the switches.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST

OBJ Object
1 Detection unit
10, 12, 13 Light receiving circuit
11 Light receiving circuit
20 Sampler
21 Error detector
22 Error correction circuit
30 Measurement circuit
40 Control circuit
50, 51, 52, 53, 54, 55, 56 Pixel
75, 76 Light shielding portion
80, 81 Opening surface
90 Load element
91, 91, 92 Active recharge circuit
100, 101, 102 Light receiving device
200 Distance measuring device
255 Light emitting element
256 Power supply circuit

The invention claimed is:

1. A light receiving device, comprising:

a plurality of light receiving circuits, wherein each light receiving circuit of the plurality of light receiving circuits includes a light receiving element, and the plurality of light receiving circuits is configured to output a plurality of signals based on a reaction with a photon;

a power supply circuit configured to supply a power supply potential to the plurality of light receiving circuits;

a load circuit connected to at least one light receiving circuit of the plurality of light receiving circuits, wherein the load circuit is configured to supply a recharge current to the light receiving element of the at least one light receiving circuit;

an error detector configured to determine, based on a plurality of waveforms of the plurality of signals, a number of errors associated with the plurality of signals; and a control circuit configured to change, based on the determined number of errors, at least one of the power supply potential of the power supply circuit or a parameter of the load circuit, wherein the parameter of the load circuit includes at least one of the recharge current of the load circuit or a resistance value of the load circuit.

2. The light receiving device according to claim 1, wherein the at least one light receiving circuit is configured to perform a passive recharge, the control circuit is further configured to adjust the recharge current for the at least one light receiving circuit, and the number of errors associated with the plurality of signals reduces, based on the adjustment of the recharge current, to a specific number less than a threshold.

3. The light receiving device according to claim 1, wherein the at least one light receiving circuit is configured to generate a pulse for an active recharge of the light receiving element of the at least one light receiving circuit, and the control circuit is further configured to adjust a time delay associated with the pulse based on the number of errors associated with the plurality of signals.

4. The light receiving device according to claim 1, wherein the plurality of signals includes a first signal and a second signal, a pulse width of the first signal exceeds a first threshold, an interval between pulses of the second signal is less than a second threshold, the error detector is further configured to determine that at least one of the first signal or the second signal is associated with an error, and the determination of the number of errors associated with the plurality of signals is based on the determination that the at least one of the first signal or the second signal is associated with the error.

5. The light receiving device according to claim 1, wherein the light receiving element is an avalanche photo-diode.

6. A distance measuring device, comprising:

a light emitting element;

a plurality of light receiving circuits, wherein each light receiving circuit of the plurality of light receiving circuits includes a light receiving element, and the plurality of light receiving circuits is configured to output a signal based on a reaction with a photon;

a power supply circuit configured to supply a power supply potential to the plurality of light receiving circuits; and a control circuit configured to:

control the power supply potential of the power supply circuit based on the outputted signal, wherein the control of the power supply potential is during a period in which the light emitting element prohibits emission of light, at least one light receiving circuit of the plurality of light receiving circuits is configured to generate a pulse for an active recharge of the light receiving element of the at least one light receiving circuit; and adjust, based on the outputted signal, a time delay associated with the pulse.

7. The distance measuring device according to claim 6, further comprising a plurality of load circuits connected to the plurality of light receiving circuits, wherein each load circuit of the plurality of load circuits is configured to supply a recharge current to the light receiving element of a respective light receiving circuit of the plurality of light receiving circuits, and the control circuit is further configured to control, based on the outputted signal, at least one of a resistance value of the plurality of load circuits or the recharge current of the plurality of load circuits.

8. A light receiving circuit, comprising:

a light receiving element;

a passive recharge circuit including:

a current source;

a first switch configured to turn on one of:

a first contact side of the first switch connected to a reference potential, or a second contact side of the first switch connected to the light receiving element;

a current mirror circuit configured to:

mirror a first current that flows between the reference potential and the current source; and supply, from an output side of the current mirror circuit, a second current based on the mirroring of the first current; and a first transistor having each of:

a first signal electrode connected to the reference potential, a second signal electrode connected to each of the light receiving element and the output side of the current mirror circuit, and a control electrode connected to the first switch; and an active recharge circuit including:

a pulse generator having an input terminal and an output terminal;

a second switch; and a second transistor having each of:

a first signal electrode connected to the reference potential, a second signal electrode connected to the second switch, a control electrode connected to the output terminal of the pulse generator, wherein the input terminal of the pulse generator is connected to an output side of the light receiving circuit, and the second switch is connected between the second transistor and the light receiving element.

9. The light receiving circuit according to claim 8, further comprising:

a plurality of first switches that includes the first switch; and a plurality of first transistors that includes the first transistor, wherein the passive recharge circuit is configured to supply a third current to the light receiving element based on switching of the plurality of first switches, and a value of the third current is N multiples of a value of the first current, where 'N' is a positive integer.

10. The light receiving circuit according to claim 8, further comprising a readout circuit configured to generate a pulse in a case where the light receiving element reacts with a photon.

11. A light receiving circuit, comprising:

a light receiving element;

a passive recharge circuit including:

a plurality of resistors connected in parallel between a reference potential and the light receiving element; and a plurality of first switches, wherein each first switch of the plurality of first switches is connected in series with a respective resistor of the plurality of resistors;

an active recharge circuit including:

a pulse generator having an input terminal and an output terminal;

a second switch; and a transistor having each of:

a first signal electrode connected to the reference potential, a second signal electrode connected to the second switch, a control electrode connected to the output terminal of the pulse generator, wherein the input terminal of the pulse generator is connected to an output side of the light receiving circuit, and the second switch is connected between the transistor and the light receiving element; and a readout circuit configured to generate a pulse in a case where the light receiving element reacts with a photon, wherein at least one of the passive recharge circuit or the active recharge circuit is configured to supply a current to the light receiving element, and the current, supplied by the passive recharge circuit, is based on switching of the plurality of first switches.

12. A light receiving device, comprising:

a plurality of light receiving circuits, wherein each light receiving circuit of the plurality of light receiving circuits includes a light receiving element, and the plurality of light receiving circuits is configured to output a plurality of signals based on a reaction with a photon;

a power supply circuit configured to supply a power supply potential to the plurality of light receiving circuits;

a load circuit connected to at least one light receiving circuit of the plurality of light receiving circuits, wherein the load circuit is configured to supply a recharge current to the light receiving element of the at least one light receiving circuit;

an error correction circuit configured to:

determine, based on a plurality of waveforms of the plurality of signals, a number of errors associated with the plurality of signals; and correct the plurality of waveforms of the plurality of signals based on the determined number of errors; and a control circuit configured to change, based on the determined number of errors, at least one of the power supply potential of the power supply circuit or a parameter of the load circuit, wherein the parameter of the load circuit includes at least one of the recharge current of the load circuit or a resistance value of the load circuit.

13. The light receiving device according to claim 12, wherein the at least one light receiving circuit is configured to perform a passive recharge, the control circuit is further configured to adjust, based on the number of errors associated with the plurality of signals, the recharge current in the passive recharge of the at least one light receiving circuit.

14. The light receiving device according to claim 12, wherein the at least one light receiving circuit is configured to generate a pulse for an active recharge of the light receiving element of the at least one light receiving circuit, and the control circuit is further configured to adjust a time delay associated with the pulse based on the number of errors associated with the plurality of signals.

15. The light receiving device according to claim 12, wherein the plurality of signals includes a first signal and a second signal, a pulse width of the first signal exceeds a first threshold, an interval between pulses of the second signal is less than a second threshold, the error correction circuit is further configured to determine that at least one of the first signal or the second signal is associated with an error, and the determination of the number of errors associated with the plurality of signals is based on the determination that the at least one of the first signal or the second signal is associated with the error.

\*　\*　\*　\*　\*